United States Patent
Lynch et al.

(10) Patent No.: US 9,310,981 B2
(45) Date of Patent: Apr. 12, 2016

(54) SEAMLESS EDITING AND SAVING OF ONLINE CONTENT ITEMS USING APPLICATIONS

(71) Applicant: Dropbox, Inc., San Francisco, CA (US)

(72) Inventors: Sean Lynch, San Francisco, CA (US);
Brian Smith, San Francisco, CA (US);
Ilya Fushman, Palo Alto, CA (US);
Josiah Boning, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/105,059

(22) Filed: Dec. 12, 2013

(65) Prior Publication Data

US 2014/0229839 A1 Aug. 14, 2014

Related U.S. Application Data

(60) Provisional application No. 61/764,392, filed on Feb. 13, 2013.

(51) Int. Cl.
| | |
|---|---|
| *G06F 3/048* | (2013.01) |
| *G06F 17/30* | (2006.01) |
| *G06F 17/24* | (2006.01) |
| *G06F 9/445* | (2006.01) |

(Continued)

(52) U.S. Cl.
CPC ........ *G06F 3/04842* (2013.01); *G06F 9/44505* (2013.01); *G06F 17/24* (2013.01); *G06F 17/30011* (2013.01); *G06F 17/30893* (2013.01); *H04L 67/02* (2013.01)

(58) Field of Classification Search
CPC ..... G06F 17/30165; G06F 21/31; G06F 9/44;
G06F 17/3089; G06F 17/30575; G06F 17/24;
H04L 67/1095; H04L 67/02; H04L 67/2814;
H04L 67/2838; H04L 67/18
USPC ......................................................... 716/736
See application file for complete search history.

(56) References Cited

U.S. PATENT DOCUMENTS 8,572,602 B1 * 10/2013 Colton et al. .................. 717/177
8,612,470 B1 * 12/2013 Fushman et al. .............. 707/767

(Continued)

FOREIGN PATENT DOCUMENTS

WO 2011/117461 A1 9/2011

OTHER PUBLICATIONS

Schreiber, Zvi. PCT/IL2008/000318 published Sep. 18, 2008 as WO2008/111049 A2.*
Webopedia definitions for "cloud storage," "storage cloud," and "cloud" as available Apr. 2012. Retrieved via Internet Archive from <http://www.webopedia.com> on <Jun. 2, 2015>.*
Thorpe, Danny. Secure Cross-Domain Communication in the Browser. The Architecture Journal. Jul. 2007. Retrieved from < https://msdn.microsoft.com/en-us/library/bb735305.aspx> on <Jun. 2, 2015>.*

(Continued)

*Primary Examiner* — Amy M Levy
(74) *Attorney, Agent, or Firm* — Sheppard, Mullin, Richter & Hampton LLP

(57) ABSTRACT

A user viewing an online content item using an online content client application can, from within that application, launch an operating application to operate on the content item. The operating application can interact with the online content management provider to obtain a current copy of the content item and to save a modified content item back to the online content management service, e.g., if the user instructs the operating application to save the item. Interactions between the client application, the operating application and the online content management service can occur without requiring the user to manually initiate upload or download of any content items. Operations on an online content item can also be initiated from within an operating application.

11 Claims, 28 Drawing Sheets

(51) Int. Cl.
*H04L 29/08* (2006.01)
*G06F 3/0484* (2013.01)

(56) References Cited

U.S. PATENT DOCUMENTS

| | | | |
|---|---|---|---|
| 2002/0055958 A1* | 5/2002 | Edwards et al. | 707/514 |
| 2002/0120858 A1* | 8/2002 | Porter et al. | 713/200 |
| 2002/0161680 A1* | 10/2002 | Tarnoff | 705/35 |
| 2002/0178271 A1* | 11/2002 | Graham et al. | 709/229 |
| 2006/0136389 A1 | 6/2006 | Cover et al. | |
| 2006/0224885 A1* | 10/2006 | Lillie et al. | 713/153 |
| 2006/0233375 A1* | 10/2006 | Lillie et al. | 380/270 |
| 2007/0244906 A1* | 10/2007 | Colton et al. | 707/10 |
| 2010/0095124 A1* | 4/2010 | Mardikar et al. | 713/171 |
| 2010/0153948 A1* | 6/2010 | Schreiber et al. | 718/1 |
| 2010/0262577 A1* | 10/2010 | Pulfer et al. | 707/608 |
| 2011/0035685 A1* | 2/2011 | Johanson et al. | 715/753 |
| 2011/0208801 A1* | 8/2011 | Thorkelsson et al. | 709/203 |
| 2011/0270721 A1* | 11/2011 | Kusterer | 705/32 |
| 2012/0084352 A1* | 4/2012 | Cho et al. | 709/203 |
| 2012/0096342 A1 | 4/2012 | Wang | |
| 2012/0110515 A1* | 5/2012 | Abramoff et al. | 715/854 |
| 2012/0131647 A1* | 5/2012 | Lan et al. | 726/4 |
| 2012/0203859 A1 | 8/2012 | Krzyzanowski | |
| 2012/0284290 A1 | 11/2012 | Keebler | |
| 2012/0331108 A1* | 12/2012 | Ferdowsi et al. | 709/219 |
| 2013/0060705 A1* | 3/2013 | Lynch | 705/71 |
| 2013/0086479 A1* | 4/2013 | Brown et al. | 715/741 |
| 2013/0138619 A1* | 5/2013 | Krislov | 707/695 |
| 2013/0205260 A1* | 8/2013 | Sung | 715/835 |
| 2013/0246901 A1* | 9/2013 | Massand | 715/229 |
| 2013/0254699 A1* | 9/2013 | Bashir et al. | 715/772 |
| 2014/0101182 A1* | 4/2014 | Roy et al. | 707/756 |
| 2014/0223527 A1* | 8/2014 | Bortz et al. | 726/6 |

OTHER PUBLICATIONS

Patel, Jay, "Box Edit with Auto-Updates Means Easier File Editing, Forever," The Box Blog Apr. 18, 2013 [online], [retrieved on Apr. 22, 2013], retrieved from the internet : <URL: http://blog.box.com/2013/04/box-edit-with-auto-updates-means-easier-file-editing-forever/>, 3 pages.

TribalOS edit files online, Datasheet [online], Tribalos.com, [retrieved on Apr. 22, 2013], retrieved from the internet: <URL: http://www.tribalos.com/en/edit>, 2 pages, reference is (c) 2009.

Cairns, Brian, "Build collaborative apps with Google Drive Realtime API," Google Developers Blog Mar. 19, 2013 [online], [retrieved on Apr. 22, 2013], retrieved from the internet: <URL: http://googledevelopers.blogspot.co.uk/2013/03/build-collborative-apps-with-google.html>, 5 pages.

"Gladinet; Gladinet Cloud Desktop Adds Support for Google Storage and Gdrive," Telecommunications Weekly, Feb. 17, 2010, [online], retrieved from the internet: <URL: http://search.proquest.com/docview/217396877?accountid=142944, 2 pages.

"SugarSync Inc.; SugarSync Adds Essential New Capabilities to iPad App: Now Open, Edit, Save, and Re-Sync All Your Remote Files," Information Technology Business, May 4, 2010, [online], retrieved from the internet: <URL: http://search.proquest.com/docview/193985724?accountid=142944, 2 pages.

Whitehead, E. J., et al., "WebDAV—A network protocol for remote collaborative authoring on the Web," Proceedings of the Sixth European Conference on Computer Supported Cooperative Work; Sep. 12-16, 1999, Copenhagen, Denmark, 20 pages.

International Search Report and Written Opinion mailed Mar. 18, 2014 in PCT/US2013/075877, 14 pages.

* cited by examiner

| | 700 | |
|---|---|---|
| ⊙☞¢ℳℴ$ | | Bob T. User |

| | Name | Kind | Modified |
|---|---|---|---|
| | Folder 1 | folder | |
| | Folder 2 | shared folder | |
| EDIT | File1.pdf | document (pdf) | 2 seconds ago |
| EDIT | File2.pdf | document (pdf) | Yesterday 10:03 PM |
| EDIT | Photo | [X] | 1/1/2013 12:03 AM |
| EDIT | Text.t | *File1.pdf edited!* (t) | 1/1/2013 12:03 AM |

SEAMLESS EDITING AND SAVING OF ONLINE CONTENT ITEMS USING APPLICATIONS

CROSS-REFERENCE TO RELATED APPLICATION

This application claims the benefit of U.S. Provisional Application No. 61/764,392, filed Feb. 13, 2013, entitled "Seamless Editing and Saving of Online Content Items Using Applications," the disclosure of which is incorporated by reference herein in its entirety.

BACKGROUND

The present disclosure relates generally to online content management systems and in particular to seamless editing and saving of content items stored in an online content management system using application programs.

Online content management services allow users to access and manage content across multiple devices using the Internet. In a typical online content management service, a user establishes an account with the service provider and to associate various content items with the account. For example, some online content management services may allow the user to store content items (including but not limited to text documents; email messages; text messages; other types of messages; media files such as photos, videos, and audio files; and/or folders containing multiple files) and to selectively allow other users to access the content items. Content items can be stored in a master repository maintained by the service provider and mirrored to or synchronized with local copies on various user devices. Users may also be able to receive updates based on activity of other users; for instance, in a social network, status updates or other content items posted by one user can be propagated to other users who have indicated interest in receiving them.

Among other features, online content management services allow users to access content items from a variety of clients, such as web browsers, desktop application programs, and mobile-device apps. Users can modify content items stored on the online content management system and store the modified items in the system.

SUMMARY

In existing systems, modifying content items stored by an online content management service can be cumbersome for users. For example, a user may need to use an online content client application to download a local copy of the content item from the online content management service, open the local copy in an appropriate application for modifying it, modify the local copy, save the modification locally, then return to the online content client application to upload the modified local copy to the online content management service. This process can be tedious and error-prone; for example, the user may forget to upload the modified local copy or may upload the modified local copy to a different location.

Certain embodiments of the present invention relate to more seamless workflows for working with content items stored in an online content management service. For example, a user viewing a content item or listing of content items using an online content client application (also referred to as a "client app") can, from within that application, launch an operating application to operate on the content item. An "operating application." or "operating app," as used herein can refer to any application capable of performing operations (e.g., editing, printing, transmitting, digitally signing, or creating) on content items of a given type (or types); such applications can be provided by a provider of the online content management system or a third party. The operating application can interact with the online content management provider to obtain a current copy of the content item and to save a modified content item back to the online content management service, e.g., if the user instructs the operating application to save the item. Interactions between the client application, the operating application and the online content management service can occur without requiring the user to manually initiate upload or download of any content items.

In some embodiments, a user can, from within a client application provided by an online content management service, open a content item stored on the online content management service using an operating application (which can be provided by a third party), modify the content item, and save the modified content item back to the online content management service. From the user's perspective, this interaction can appear as seamless as working with a locally stored content item.

In some embodiments, a user can, from within an operating application, open a content item stored on the online content management service, modify the content item, and save the modified content item back to the online content management service. From the user's perspective, this interaction can appear as seamless as working with a locally stored content item.

In some embodiments, a user can create new content items from within an operating application and have the new item stored on the online content management service. Again, this interaction can appear seamless to the user.

The following detailed description together with the accompanying drawings will provide a better understanding of the nature and advantages of the present invention.

BRIEF DESCRIPTION OF THE DRAWINGS

FIG. 7 shows an interface that can appear when control is returned to the client app according to an embodiment of the present invention.

DETAILED DESCRIPTION

Certain embodiments of the present invention relate to more seamless workflows for working with content items stored in an online content management service. For example, a user viewing a content item or listing of content items using an online content client application (also referred to as a "client app") can, from within that application, launch an operating application to operate on the content item. An "operating application," or "operating app," as used herein can refer to any application capable of performing operations (e.g., editing, printing, transmitting, digitally signing, or creating) on content items of a given type (or types); such applications can be provided by a provider of the online content management system or a third party. The operating application can interact with the online content management provider to obtain a current copy of the content item and to save a modified content item back to the online content management service, e.g., if the user instructs the operating application to save the item. Interactions between the client application, the operating application and the online content management service can occur without requiring the user to manually initiate upload or download of any content items.

In some embodiments, a user can, from within a client application provided by an online content management service, open a content item stored on the online content management service using an operating app (which can be provided by a third party), modify the content item, and save the modified content item back to the online content management service. From the user's perspective, this interaction can appear as seamless as working with a locally stored content item.

In some embodiments, a user can, from within an operating application, open a content item stored on the online content management service, modify the content item, and save the modified content item back to the online content management service. From the user's perspective, this interaction can appear as seamless as working with a locally stored content item.

In some embodiments, a user can create new content items from within an operating application and have the new item stored on the online content management service. Again, this interaction can appear seamless to the user.

Figure 1:
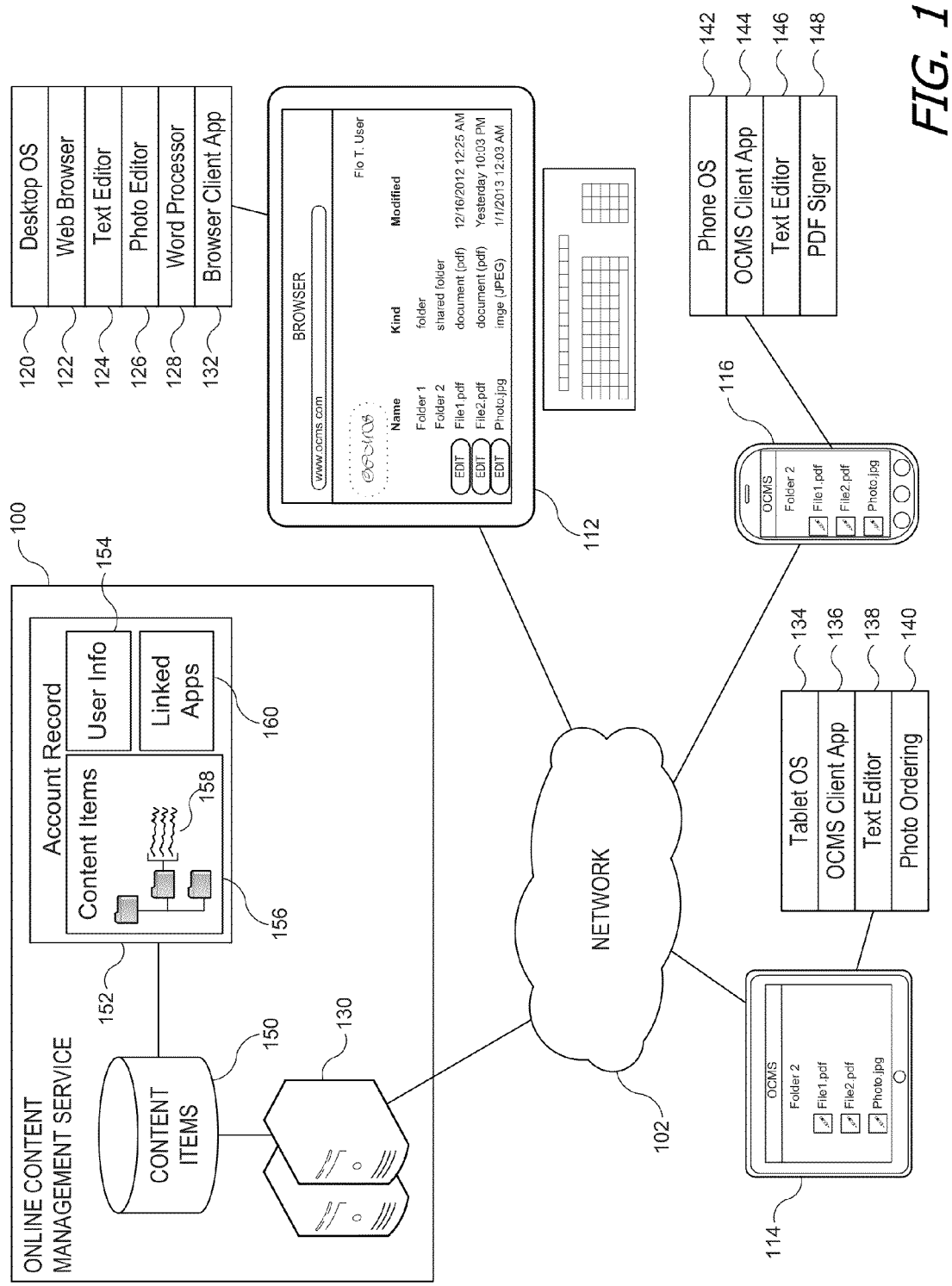
FIG. 1 shows user devices interacting with an online content management service according to an embodiment of the present invention.

FIG. 1 shows user devices interacting with an online content management service 100 according to an embodiment of the present invention. Online content management service (sometimes abbreviated as "OCMS") 100 can include, for example, a file storage service, a file sharing service, a social media service that allows users to post and edit messages and/or other content, and so on. In some embodiments, online content management service 100 can provide file storage, sharing, and synchronization for users across multiple platforms. Online content management service 100 can be hosted on servers 130 maintained by a service provider and accessed via a network 102, such as the Internet.

Users can access online content management service 100 using various application programs executing on user devices such as a desktop (or laptop) computer 112, tablet computer 114, and/or smart phone 116. In general, different user devices 112, 114, 116 can implement different operating platforms (a "platform" refers to a combination of hardware and operating system software). The provider of online content management service 100 and/or various third parties can provide application programs (also referred to herein as "apps") adapted to various platforms; application programs are generally programs that are launchable on request of the user, although some applications may also be automatically launched under some circumstances. In embodiments described herein, some or all application programs can allow the user to access content items stored on online content management service 100; such access can include adding items, deleting items, modifying items, and/or organizing items (e.g., using a folder hierarchy).

For example, desktop computer 112 can implement a desktop operating system ("OS") 120 and various applications that are executable on desktop OS 120, such as web browser 122, text editor 124, photo editor 126, and word processor 128. Web browser 122 (which can be, e.g., the INTERNET EXPLORER® web browser (a product of MICROSOFT CORP.), the GOOGLE CHROME® web browser (a product of GOOGLE INC.), the SAFARI® web browser (a product of APPLE INC.), or similar software) can be operable to interact with various servers via network 102, including servers 130 associated with online content management service 100. In some embodiments, web browser 122 can interact with servers 130 to execute a browser-based OCMS client app 132 that can access content on service 100. Program code implementing browser-based client app 132 can be stored on desktop computer 112 or delivered to desktop computer 112 on an as-needed basis by servers 130; for example, code implementing client app 132 can be downloaded when browser 122 accesses servers 130.

As another example, tablet computer 114 can implement a tablet OS 134 (e.g., the ANDROID® operating system (a product of the OPEN HANDSET ALLIANCE), the APPLE iOS operating system (a product of APPLE INC.), or the like)

and various apps that are executable on the tablet OS. These apps can include an OCMS client app 136 supplied by the provider of online content management service 100. Other apps can also be present, such as text editor 138 and photo ordering app 140.

Similarly, smart phone 116 can implement a phone OS 142 (e.g., the ANDROID operating system or the APPLE iOS operating system as mentioned above, or the like) and various apps that are executable on the phone OS. These apps can include an OCMS client app 144 supplied by the provider of online content management service 100. Other apps can also be present, such as text editor 146 and PDF signer 148.

Online content management service 100 can manage a data store 150 of content items. In some embodiments, some or all of the content items in data store 150 are "owned" by particular users and are visible only to that user and potentially others to whom the user has granted access. For example, in one implementation, content items data store 150 can be organized around records of user accounts, such as account record 152. Account record 152 can be associated with a unique user identifier and can include user information 154 (e.g., user name, password, email address) and information 156 about content items 158 that have been stored by the account's user in data store 150. In some embodiments, information 156 may include the actual content items 158; in other embodiments, information 156 may provide references to locations where actual content items 158 are stored.

In operation, a user may establish an account with online content management service 100; this can involve, e.g., creating a user record 152. Once the account is established, the user can access the account from any device (including any of devices 112, 114, 116) by using a suitable OCMS client app (e.g., any of OCMS client apps 132, 136, 144). Accessing the account can include, e.g., providing appropriate credentials (e.g., a username and password) through a user interface of client app 132, 136, 144. In some embodiments, a persistent link between the client app and the account can be established when the user first enters credentials; accordingly, the user need not be prompted to enter credentials each time an OCMS client app is launched.

Using an OCMS client app and/or other apps, a user can create, modify and/or delete content items 158 associated with the user's account record 152. In some embodiments, an OCMS client app can also allow the user to organize content items 158, e.g., using a folder hierarchy or other structures. In some embodiments, an OCMS client app can also provide an interface allowing the user to selectively share content items with other users; accordingly, multiple users may have access to the same content item.

As used herein, an OCMS client app (also referred to simply as a "client app") refers to an app provided by the operator of online content management service 100 and adapted to interact with servers 130. In some embodiments, the user can also link other apps (e.g., any of apps 124, 126, 128, 138, 140, 146, 148) to the account, and such apps may thereafter be able to access the account. For example, text editor app 124 (or any other app) can provide an interface that prompts the user to enter her account credentials, e.g., when app 124 is first launched or when a user selects a "link" option from a settings menu. App 124 can transmit the account credentials and an identifier of itself to servers 130. A link between app 124 and the user's account record 152 can be established if servers 130 successfully verify the user's credentials. As with a client app, linking another app to a user's account can allow the app to access content items stored by online client management service 100 (such items are also referred to herein as "online content items"). In some embodiments online content management service 100 can maintain a record of linked apps 160. As described below, in some instances an app may be allowed to access one or more of a user's online content items without having established a link.

In some embodiments, client apps (e.g., apps 132, 136, 144) may provide limited (or no) interfaces for editing or modifying content items stored by online content management service 100. However, a client app (e.g., apps 132, 136, 144) can interact with other apps available on the same user device (e.g., app 132 can interact with any of apps 124, 126, 128) to allow the user to edit content items in an intuitive, seamless manner. Specific examples of such interactions are described below.

It will be appreciated that the systems shown in FIG. 1 are illustrative and that variations and modifications are possible. User devices can include any type of computing device and are not limited by form factor, particular hardware components, operating systems, or the like. Any app or combination of apps can be installed or supported on a given user device, and different user devices may have the same apps, similar apps, and/or different apps or combinations of apps. Any type of content item can be stored and managed using online content management service 100. Examples include documents (e.g., text documents, word-processor documents, Portable Document Format (PDF) files), email messages, text messages, other types of messages, media files (e.g., photos, audio, video), and/or folders containing multiple files. Online content management service 100 can organize the information it stores in any manner desired and can store information locally (e.g., at a central data and server warehouse facility) or in a distributed manner.

Figure 2:
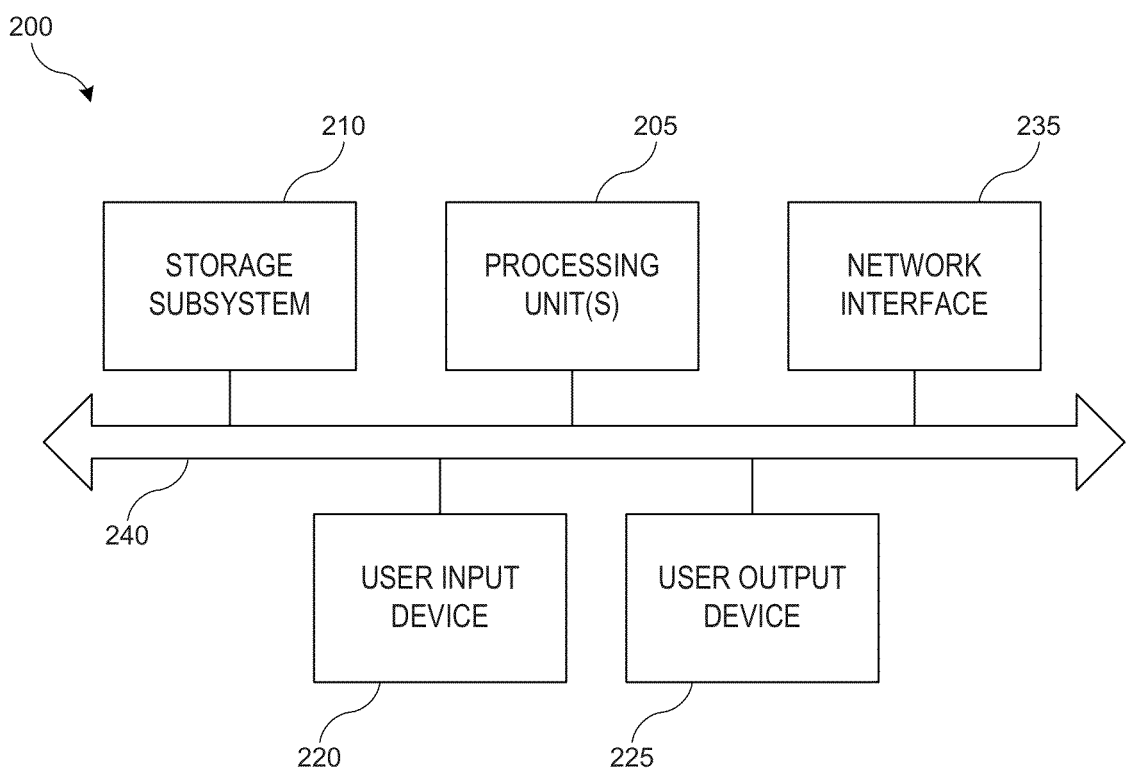
FIG. 2 shows a simplified block diagram of a representative computer system.

Various operations described herein can be implemented on computer systems, which can include systems of generally conventional design. FIG. 2 shows a simplified block diagram of a representative computer system 200. In various embodiments, computer system 200 or similar systems can implement a user device (e.g., any of devices 112, 114, 116 of FIG. 1) or a server (e.g., one or more of servers 130 of FIG. 1). Computer system 200 can include processing unit(s) 205, storage subsystem 210, input devices 220, output devices 225, network interface 235, and bus 240.

Processing unit(s) 205 can include a single processor, which can have one or more cores, or multiple processors. In some embodiments, processing unit(s) 205 can include a general-purpose primary processor as well as one or more special-purpose co-processors such as graphics processors, digital signal processors, or the like. In some embodiments, some or all processing units 205 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 205 can execute instructions stored in storage subsystem 210.

Storage subsystem 210 can include various memory units such as a system memory, a read-only memory (ROM), and a permanent storage device. The ROM can store static data and instructions that are needed by processing unit(s) 205 and other modules of computer system 200. The permanent storage device can be a read-and-write memory device. This permanent storage device can be a non-volatile memory unit that stores instructions and data even when computer system 200 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 205 need at runtime.

Storage subsystem 210 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 210 can include removable storage media that can be readable and/or writeable; examples of such media include compact disc (CD), read-only digital versatile disc (e.g., DVD-ROM, dual-layer DVD-ROM), read-only and recordable Blue-Ray disks, ultra density optical disks, flash memory cards (e.g., SD cards, mini-SD cards, micro-SD cards, etc.), magnetic disks, and so on. The computer readable storage media do not include carrier waves and transitory electronic signals passing wirelessly or over wired connections.

In some embodiments, storage subsystem 210 can store one or more software programs to be executed by processing unit(s) 205, such as an operating system (e.g., operating systems 120, 134, 132 of FIG. 1), a browser app (e.g., web browser 122), an OCMS client app (e.g., apps 132, 126, 144), apps for operating on local and/or online content items (e.g., apps 124, 126, 128, 138, 140, 146, 148), and so on. "Software" refers generally to sequences of instructions that, when executed by processing unit(s) 205 cause computer system 200 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 205. Software can be implemented as a single program or a collection of separate programs or program modules that interact as desired. From storage subsystem 310, processing unit(s) 205 can retrieve program instructions to execute and data to process in order to execute various operations described herein.

A user interface can be provided by one or more user input devices 220 and one or more user output devices 225. Input devices 220 can include any device via which a user can provide signals to computer system 200; computer system 200 can interpret the signals as indicative of particular user requests or information. In various embodiments, input devices 220 can include any or all of a keyboard, touch pad, touch screen, mouse or other pointing device, scroll wheel, click wheel, dial, button, switch, keypad, microphone, and so on.

User output devices 225 can include any device via which computer system 200 can provide information to a user. For example, user output devices 225 can include a display to display images generated by computer system 200. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 225 can be provided in addition to or instead of a display. Examples include indicator lights, speakers, tactile "display" devices, printers, and so on.

In some embodiments, input device 220 and output devices 225 can interoperate to provide a graphical user interface ("GUI") that allows a user to interact with computer system 200 by using an input device to select a control element displayed on the screen (e.g., by operating a pointing device such as a mouse or touching the location where a control element is displayed on a touch screen).

Network interface 235 can provide voice and/or data communication capability for computer system 200. In some embodiments, network interface 235 can include radio frequency (RF) transceiver components for accessing wireless voice and/or data networks (e.g., using cellular telephone technology, advanced data network technology such as 3G, 4G or EDGE, WI-FI wireless networking technology (i.e., any wireless local area network product based on INSTITUTE OF ELECTRICAL AND ELECTRONIC ENGINEERS' (IEEE) 802.11 family standards and promulgated by the WI-FI ALLIANCE), or other mobile communication technologies, or any combination thereof), GPS receiver components, and/or other components. In some embodiments, network interface 235 can provide wired network connectivity (e.g., Ethernet) in addition to or instead of a wireless interface. Network interface 235 can be implemented using a combination of hardware (e.g., antennas, modulators/demodulators, encoders/decoders, and other analog and/or digital signal processing circuits) and software components.

Bus 240 can include various system, peripheral, and chipset buses that communicatively connect the numerous components of computer system 200. For example, bus 240 can communicatively couple processing unit(s) 205 with storage subsystem 210. Bus 240 can also connect to input devices 220 and output devices 225. Bus 240 can also couple computing system 200 to a network through network interface 235. In this manner, computer system 200 can be a part of a network of multiple computer systems (e.g., a local area network (LAN), a wide area network (WAN), an intranet, or a network of networks, such as the Internet.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 205 can provide various functionality for computer system 200. For example, in tablet computer 114, processing unit(s) 205 can execute operating system 134, client app 136, and various operating apps 138, 140 that provide interfaces operable by the user to interact with content items. In desktop computer 112, processing unit(s) 205 can execute operating system 120 and browser application 122, which provides the ability to retrieve and display content items from various sources (e.g., using HTTP or other data transfer protocols to retrieve and display web pages) and the ability to receive and interpret user input pertaining to retrieved content items. A user can operate browser application 122 to interact with online content management service 100, and such interaction can include executing browser-based client app 132. Desktop computer 112 can also execute various operating apps 124, 126, 128 that provide interfaces operable by the user to interact with content items.

In some embodiments, aspects of online content management system 100 of FIG. 1 can also be implemented using computer systems similar to system 200. For example, servers 130 can be implemented using one or more instances of system 200, and software executing on these systems can implement various operational modules, such as a user authentication module, a web server module to process HTML requests or other data requests from remote systems, a database search module to search content data store 150, a database management module to facilitate storage and retrieval of content items from content data store 150, application program interfaces ("APIs") to support other applications' ability to locate and/or create content items (examples are described below), and so on. In server embodiments, a user interface may be located remotely from processing unit(s) 205 and/or storage subsystem 210; similarly, storage subsystem 210 or portions thereof may be located remotely from processing unit(s) 205. Accordingly, in some instances, various components of computer system 200 need not be physically located in any particular proximity to each other.

It will be appreciated that computer system 200 is illustrative and that variations and modifications are possible. Computer system 200 can have other capabilities not specifically described here (e.g., mobile phone, global positioning system (GPS), power management, one or more cameras, various connection ports for connecting external devices or accessories, etc.). Further, while computer system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Certain embodiments of the present invention can facilitate editing of or other operations on content items stored by online content management service 100 of FIG. 1 using any of user devices 112, 114, 116 (or other user devices). For example, editing can be facilitated through interaction between client app 132 of FIG. 1 (or client apps 136 or 144) and an "editing app" such as any of apps 124, 126, 128 that provides an interface for editing content items. As used herein, the term "editing" includes modifying any aspect of the content item, including content, formatting, metadata, and the like. Examples of editing apps include text editors (e.g., apps 124, 138, 146), word processors (e.g., app 128), presentation editing software, spreadsheet applications, photo editing software (e.g., app 126), video editing software, applications that provide digital-signature functionality (e.g., app 148), and so on. Editing apps can be specialized for content items having particular data formats (also referred to as "content types" or "file types"), and content items of different types can be distinguished, e.g., based on a filename extension appended to the content item's name (e.g., ".pdf," ".doc," ".txt," ".jpg" and so on) and/or metadata associated with the content item.

Figure 3:
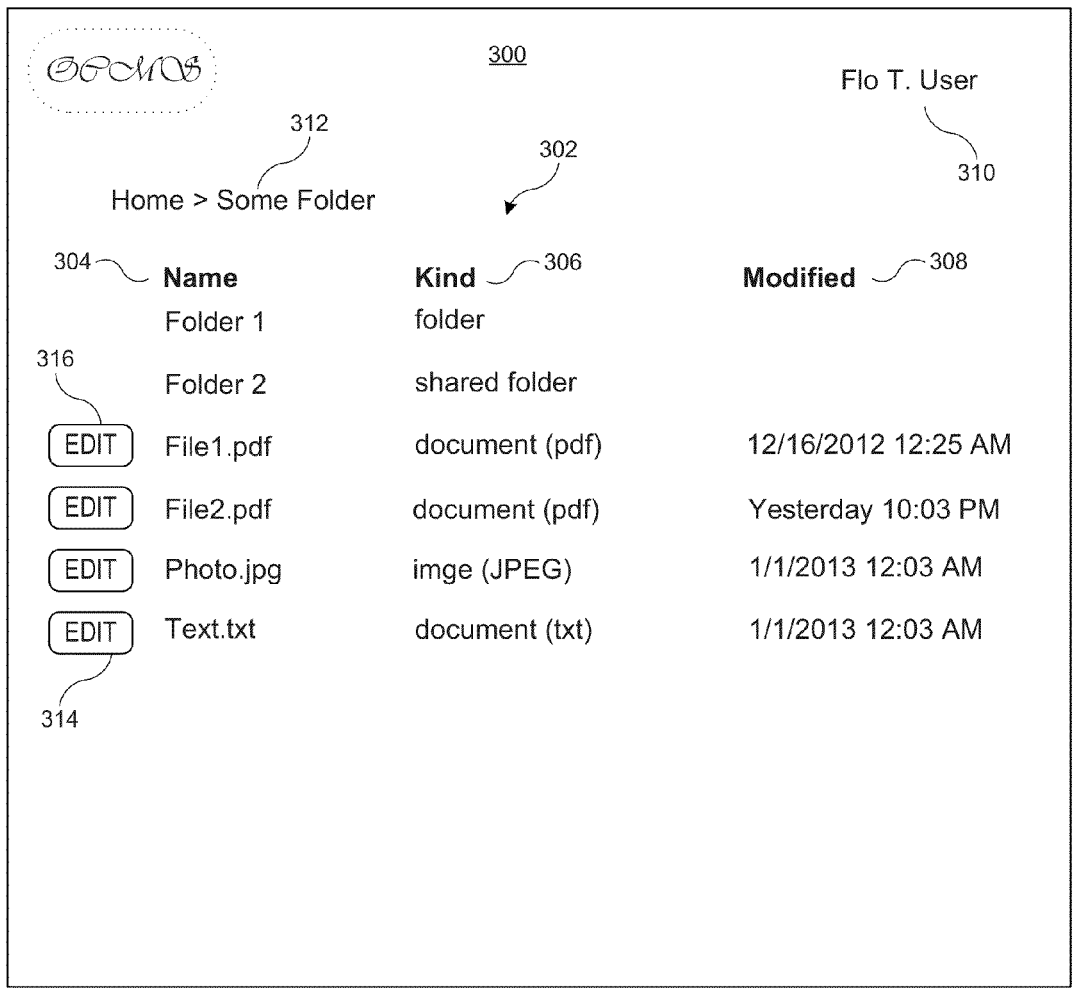
FIG. 3 shows a user interface for a client app according to an embodiment of the present invention.

Examples of workflow for editing a content item stored by online content management service 100 will now be described. FIG. 3 shows a user interface 300 for a client app (e.g., client app 132, 136, 144 of FIG. 1) according to an embodiment of the present invention. Interface 300 can be displayed, e.g., within a browser executing on a user device (such as user device 112 executing browser 122) or in a standalone window or in a full-screen mode as desired. Interface 300 can show a list 302 of online content items associated with the user's account, along with information about each content item such as name 304, type 306, and modification date 308. In some embodiments, headers 304, 306, 308 can be user-operable control elements, allowing the user to sort list 302, e.g., by clicking on or otherwise selecting the header to be used for the sort. Other information, such as an identifier of the user 310 and a current path 312 within a folder hierarchy, can also be shown.

Interface 300 can provide controls operable to invoke editing of content items in listing 302, such as edit buttons 314, 316. In this example, each editable content item has a different edit button associated with it, and the user can select an item for editing by operating the corresponding edit button. In this example, content items that are folders do not have edit buttons; however, it is to be understood that folders can be modified, e.g., by adding or deleting content items, by changing the folder name, or by moving the folder to a new location within a hierarchy of folders. Such operations can be handled by client app 132 (or 134 or 136) interacting with online content management service 100; a detailed description is omitted.

In this example, content items that have edit buttons 314, 316 can be edited by invoking an editing app that is distinct from the client app that displays interface 300. Editing apps can be provided by third parties (or by the provider of the online content service) and can be operable independently from online client management service, e.g., to edit content items stored locally on the user device. In embodiments described herein, an editing app can interact with online content management service 100 and/or a client app to facilitate editing of content items that are stored and managed by online content management service 100. For example, an editing app can be invoked for a particular content item, e.g., in response to the user operating the corresponding edit button 312 in interface 300.

Figure 4:
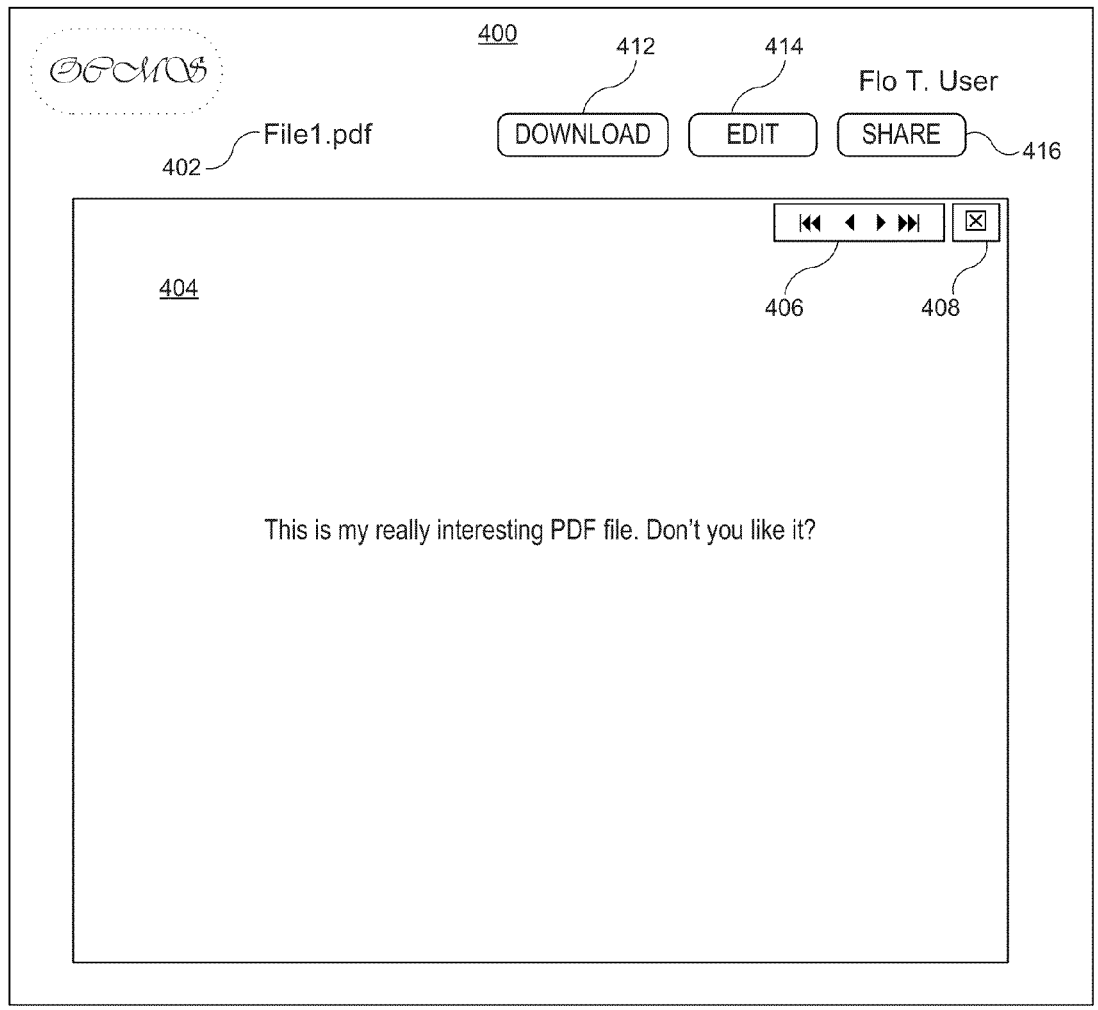
FIG. 4 shows a preview interface for a client app according to an embodiment of the present invention.

Edit buttons can be provided in other user interfaces in client app 132 (or 134 or 136). For example, FIG. 4 shows a preview interface 400 for a client app 132 according to an embodiment of the present invention. Preview interface 400 can be invoked, e.g., if a user selects a content item from interface 300 by clicking on the item's name in listing 302 or otherwise indicates a desire to preview a particular content item.

Preview interface 400 can display the name of the content item in region 402 and a representation of all or part of the content of the item in region 404. If the item has multiple pages, preview interface 400 can provide page navigation controls 406. A close button 408 can be provided to close the preview, e.g., returning to the file listing interface 300.

Interface 400 can also include other user-operable controls such as a download button 412 that can be operated to initiate a download of the previewed item to the client device, an edit button 414 that can operate similarly to edit button 312 of FIG. 3, and a share button 416 that can be operated to share the content item with other users (e.g., by providing a link to the content item).

In some embodiments, when a user operates an edit button (e.g., edit button 316 of FIG. 3 or edit button 414 of FIG. 4), the client app interacts with an editing app to allow editing of the content item. Depending on the file type of the content item and platform of a particular client device, there may be multiple editing apps that are capable of editing the item. Accordingly, in some embodiments, operation of an edit button can invoke an "app chooser" interface via which a user can select an app to be used as the editing app.

Figure 5:
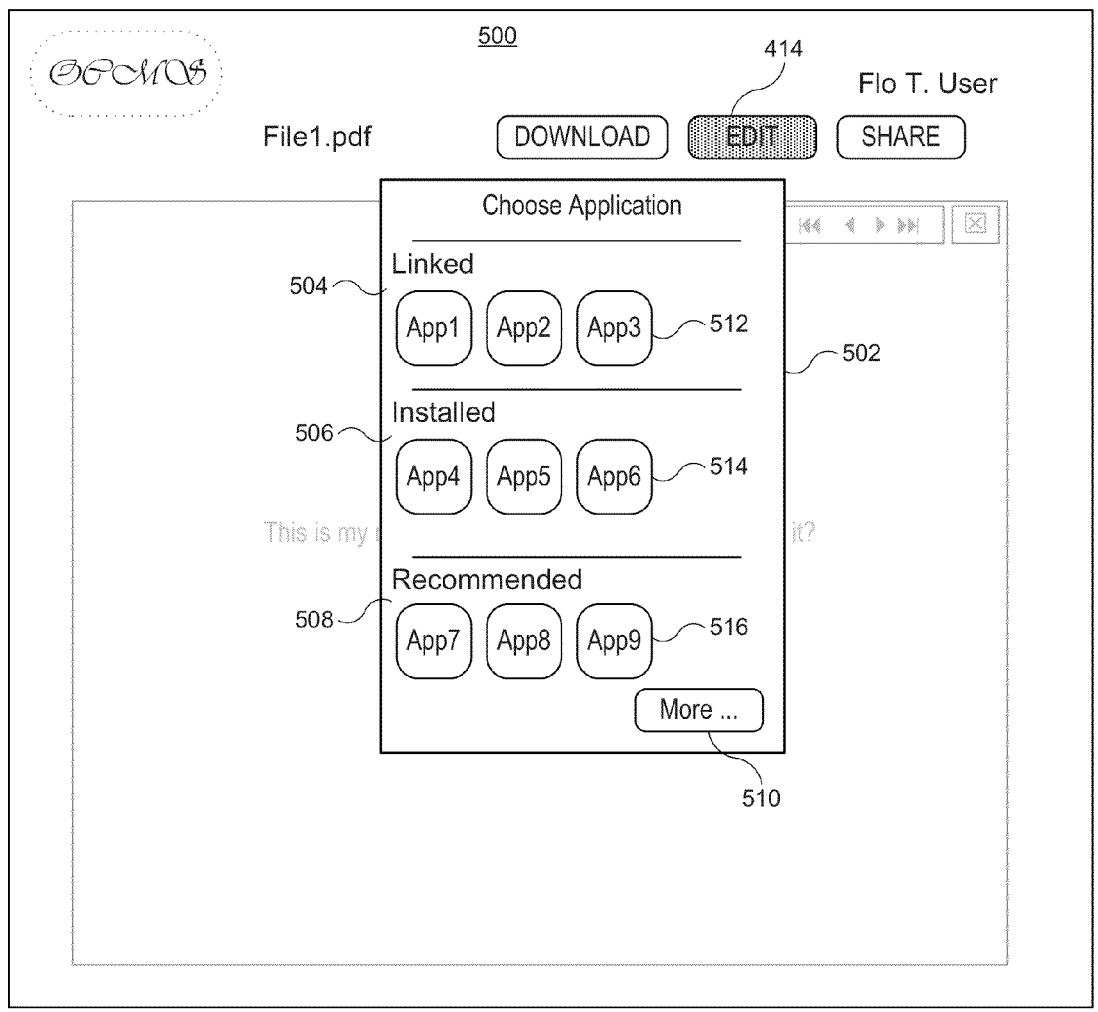
FIG. 5 shows an app chooser interface according to an embodiment of the present invention.

FIG. 5 shows an app chooser interface according to an embodiment of the present invention. In this example, the user has activated edit button 414 of FIG. 4, and in response an app chooser interface 502 has been displayed as an overlay. It is to be understood that activating edit button 312 of FIG. 3 can also result in app chooser interface 502 being displayed. App chooser interface 502 can provide a list or menu of editing apps from which the user can select a desired editing app to be invoked.

In some embodiments, any app capable of editing content items of the same file type as the selected content item can be listed in app chooser interface 502, and any number of editing apps can be listed. In the example of FIG. 5, the editing apps are categorized as "linked" (section 504), "installed" (section 506), and "recommended" (section 508). More button 510 can be provided to allow the user to search for other apps, e.g., by navigating to an online app source (e.g., the APP STORE® online application service provided by APPLE INC., or the GOOGLE APPS MARKETPLACE™ online application service provided by GOOGLE INC., or the like).

In some embodiments, listing of a particular editing app (e.g., app 512) in "linked" section 504 indicates that the user has explicitly established an association between the editing app and the user's account with online content management service 100, e.g., as described above with reference to FIG. 1. A client app (or other program) that generates app chooser interface 502 can identify linked editing apps for a particular type of content item, e.g., based on link information 160 maintained by online content management service 100. If no editing apps for the particular type of content item are linked, section 504 can be omitted or empty.

In some embodiments, listing of a particular editing app (e.g., app 514) in "installed" section 506 indicates that the editing app is installed on the client device but has not been linked to the user's account with online content management service 100. If no apps are known to be installed but unlinked, section 506 can be omitted or empty. In some embodiments, a client app (or other program) that generates app chooser interface 502 may not have access to information about apps that are installed and not linked, and section 506 can be omitted.

In some embodiments, listing of a particular editing app (e.g., app 516) in "recommended" section 508 indicates that the editing app is not linked (and/or not installed) but is recommended by the provider of online content management service 100 for editing content items of the particular type. Recommendations can be based on various criteria, such as: input from an editorial team that tests various editing apps to determine which ones to recommend; crowdsourcing data (e.g., aggregate user ratings for various apps, aggregate patterns of user behavior such as which editing apps are most often used for particular types of content items); the user's own behavior (e.g., which editing apps the user has used on other platforms or for other content items of this type or for this content item); and/or behavior of other users who share access to the content item in question. A combination of any of these and/or other criteria can be used to determine which editing apps to recommend and in what order to display recommended editing apps.

It is to be understood that app chooser interface 502 can be varied. For example, an app chooser interface can include all, some or none of the groups shown in FIG. 5 and/or other groups as desired. Different groupings might or might not be defined to be mutually exclusive; in some embodiments the same app can appear in multiple groups. In some embodiments, each group can be presented as a collapsible element, and the element can be initially displayed in either an expanded or collapsed state. For example, if linked group 504 contains one or more apps, other groups can initially be displayed in a collapsed state. Any groups that do not contain at least one app can be rendered to indicate that they are empty (e.g., grayed out) or omitted entirely. An app chooser interface can represent apps using icons, names, both icons and names, and/or any other indicia as desired.

In some embodiments, default choices can be defined. For example, if a user has previously edited a given content item (or another content item of the same type) using a particular editing app, that editing app can be used as the default selection. In some embodiments, the default choice can be highlighted when app chooser interface 502 appears, or the default choice (if any) can be shown in a separate section at the top and identified as the default.

A user can operate app chooser interface 502 to select the editing app to be used, e.g., by selecting the desired app using a pointing device or touchscreen. In some embodiments, if the user selects an app that is installed but not linked, the user can be prompted to link the app to the user's account on the online content management service. In some embodiments, if the user selects an app that is not installed, the user can be prompted to install the app (which can include, e.g., purchasing and/or downloading the app from an online app source).

Figure 6A:
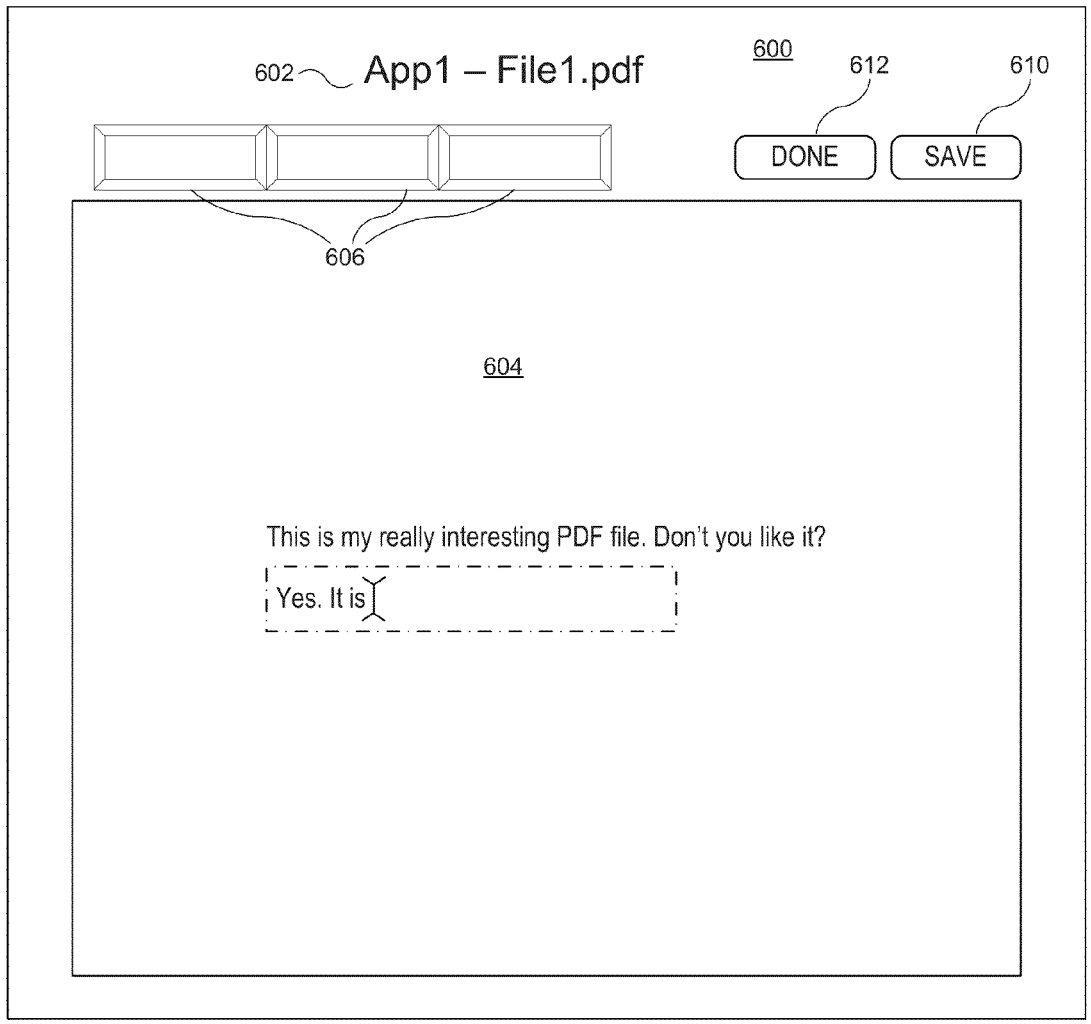
FIGS. 6A and 6B illustrate editing interfaces according to various embodiments of the present invention.
Figure 6B:
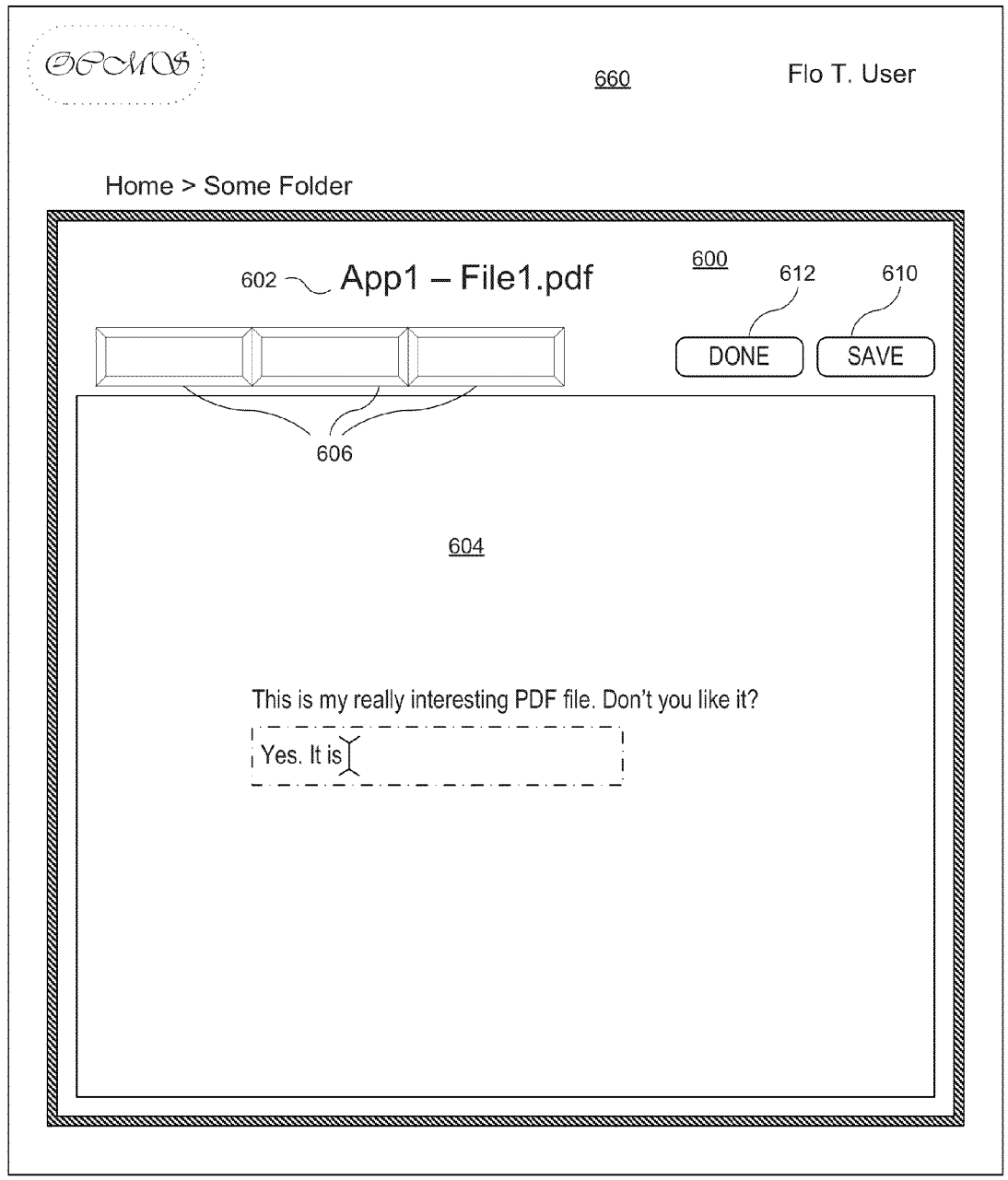

Once the user has selected an editing app, the content item can be opened for editing in the editing app. FIGS. 6A and 6B illustrate editing interfaces according to various embodiments of the present invention. In FIG. 6A, editing interface 600 can be similar or identical to the normal interface of the editing app. For example, the name of the content item being edited can be displayed in a title area 602; the item itself (or a portion thereof) can be displayed in editing region 604, and various controls 606 can be provided for invoking functions of the editing app. It is to be understood that the particular configuration of interface 600 including the size, number, content, and position of various GUI elements, can be determined as desired by the provider of the editing app and need not be affected by whether the content item being edited is sourced from online content management service 100 or some other source.

Save control 610 and done control 612 can be operated by the user to indicate that the content item should be saved and/or that the editing session should end (which can include, e.g., closing the content item and/or exiting the editing app). In instances where the content item is sourced from online content management service 100, saving the item or ending the editing session can result in the content item being stored back to content management service 100, without the need for the user to expressly direct the process.

FIG. 6B shows an editing interface 650 in which interface 600 of the editing app can be embedded within an interface 660 of a client app (e.g., client app 132). Thus, the editing app interface can be opened in a separate window or in a window embedded within the client app's interface. Whether to embed the editing app's interface or use a separate window can be a matter of design choice and can depend in part on considerations such as screen size and/or esthetic preferences of the client and/or editing app providers.

When the user ends the editing session, e.g., by operating done control 612, control can return to client app 132. FIG. 7 shows an interface 700 that can appear when control is returned to the client app according to an embodiment of the present invention. Interface 700 can be generally similar to interface 300 of FIG. 3. In some embodiments, an alert 702 can be displayed to indicate to the user that the edited content item is now present. While alert 702 is depicted as a text box overlay, other forms of user alerts can be used, e.g., a message in a dedicated message area, a format change in the list entry for the modified item (e.g., change foreground and/or background color), an icon next to the list entry for the modified item, and so on. In some embodiments, an alert need not be shown; for example, the user can confirm the update by seeing that the modification date has changed. In some embodiments, a notification that the item was modified may be sent by online content management service 100 to other devices associated with the user (e.g., any of devices 112, 114, 116 of FIG. 1), and alerts may appear on any or all of the user's client devices. In some embodiments, a notification to a particular user device can trigger the device to perform other operations, such as synchronizing a locally cached copy of the content item in question.

From the user's perspective, the interfaces of FIGS. 3-7 (or other interfaces with similar features) can provide a "seamless" workflow similar to working with locally stored content items. For example, a user can browse content items in the interface of FIG. 3 and select a content item to edit, with the item appearing in an editing interface as shown in FIGS. 6A-6B and being saved back to the location from which it was selected; the user is not required to take extra actions related to moving the content item between a working storage location accessible to the editing app (e.g., local storage on the user device) and a persistent storage location at online content management service 100.

Figure 8:
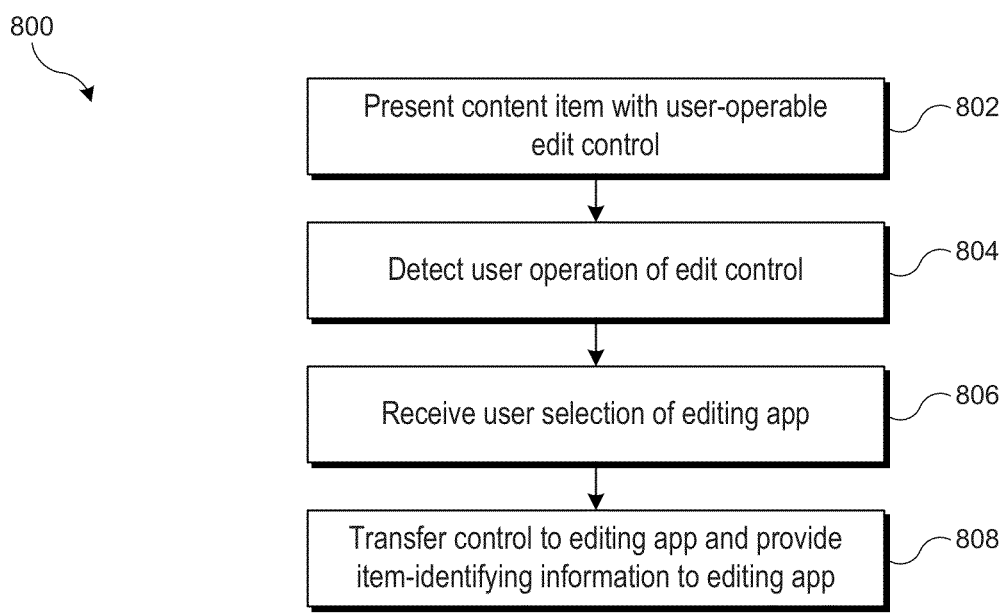
FIG. 8 shows a flow diagram of a process for launching an editing app to edit an online content item according to an embodiment of the present invention.

In some embodiments, this seamless experience can be facilitated by interactions between the client app and the editing app that can be transparent to the user. FIG. 8 shows a flow diagram of a process 800 for launching an editing app to edit a content item stored on online content management service 100 according to an embodiment of the present invention. Process 800 can be executed, e.g., by a client app (such as any of apps 132, 136, 144 of FIG. 1).

At block 802, a client app (e.g., app 132) can present a representation of one or more content items to the user in an interface, along with a control operable by the user to indicate a desire to edit the item. In some embodiments, the representation can include the name of the content item (e.g., as shown in the listing in FIG. 3). The representation can also include other information, such as content type identification, an icon or thumbnail image representing the item, or a preview of some or all of the item's content (e.g., as shown in FIG. 4). The representation can be presented in an interface that includes a user-operable edit control (e.g., edit button 316 or edit button 414). The interface can also include other controls, and the user may operate such controls, e.g., to view a different list of content items or to preview a different portion of the content item.

At block 804, the user can operate the edit control to indicate a desire to edit a particular content item. For example, the user can click on or touch edit button 316 of FIG. 3 or edit button 414 of FIG. 4.

At block 806, the user can select an editing app to be used for editing the content item. In some embodiments, client app 132 can present app chooser interface 502 of FIG. 5, and an example of a process of selecting an editing app via an interface of this kind is described below with reference to FIG. 9. Other interfaces can also be used. For instance, in some embodiments, the user can be presented with a list of all apps available on the client device and can select from the list.

At block 808, client app 132 can transfer control to the editing app. Any technique by which a first application executing on a particular user device can transfer control to a second application to execute on the same device can be used; in some instances, transferring control may include instructing the user device to launch the editing app.

For example, in the context of computer 112 of FIG. 1, if client app 132 executes within browser 122, client app 132 can redirect browser 122 to an editing app (e.g., app 128) by providing a uniform resource locator (URL) for the editing app; standard URL syntax may be used. It should be noted that the editing app can be stored locally or remotely, as a URL can point to either type of resource. To allow the editing app to obtain the file, the client app can append a resource handler to the URL of the editing app. For example, the URL can have the format:

prot://editingapp.location/ocms_edit?userID-
uuu&itemID=nnn where "prot://" indicates a transfer protocol to use, "editingapp.location/" indicates the location where the editing app resides (which can be local, e.g., if "file://" is used as the "prot://" identifier). The remainder of the URL constitutes a resource handler that is to be provided to and interpreted by the editing app. For instance, "ocms_edit" can indicate that the editing app was invoked to edit an online content item by a client app associated with online content management service 100, and "userID" and "itemID" can provide strings that the editing app can use to retrieve the content item from online content management service 100. Any editing app that can be invoked using a URL can be programmed to interpret a resource handler of this kind and use the information to retrieve the content item. Other formats can also be used.

In other embodiments, a client app executing on a given client device can transfer control to an editing app on the same device by providing a suitably formatted command string to the operating system of the client device. The command string can include parameters (e.g., a userID and an itemID) that can be delivered to the editing app, and the editing app can use these parameters to retrieve the content item from online content management service 100.

In still other embodiments, the client app may have a cached copy of the content item stored on the client device. If the operating system supports data transfer between apps, the client app can transfer the cached copy to the editing app. Other techniques can also be used, depending on how a particular platform implements allowing an executing app to invoke another app.

Once control is transferred to the editing app, process 800 can end. In some instances, the client app can continue executing, e.g., as a background process, while the user edits the document using the editing app. An example editing process is described below with reference to FIG. 10.

Figure 9:
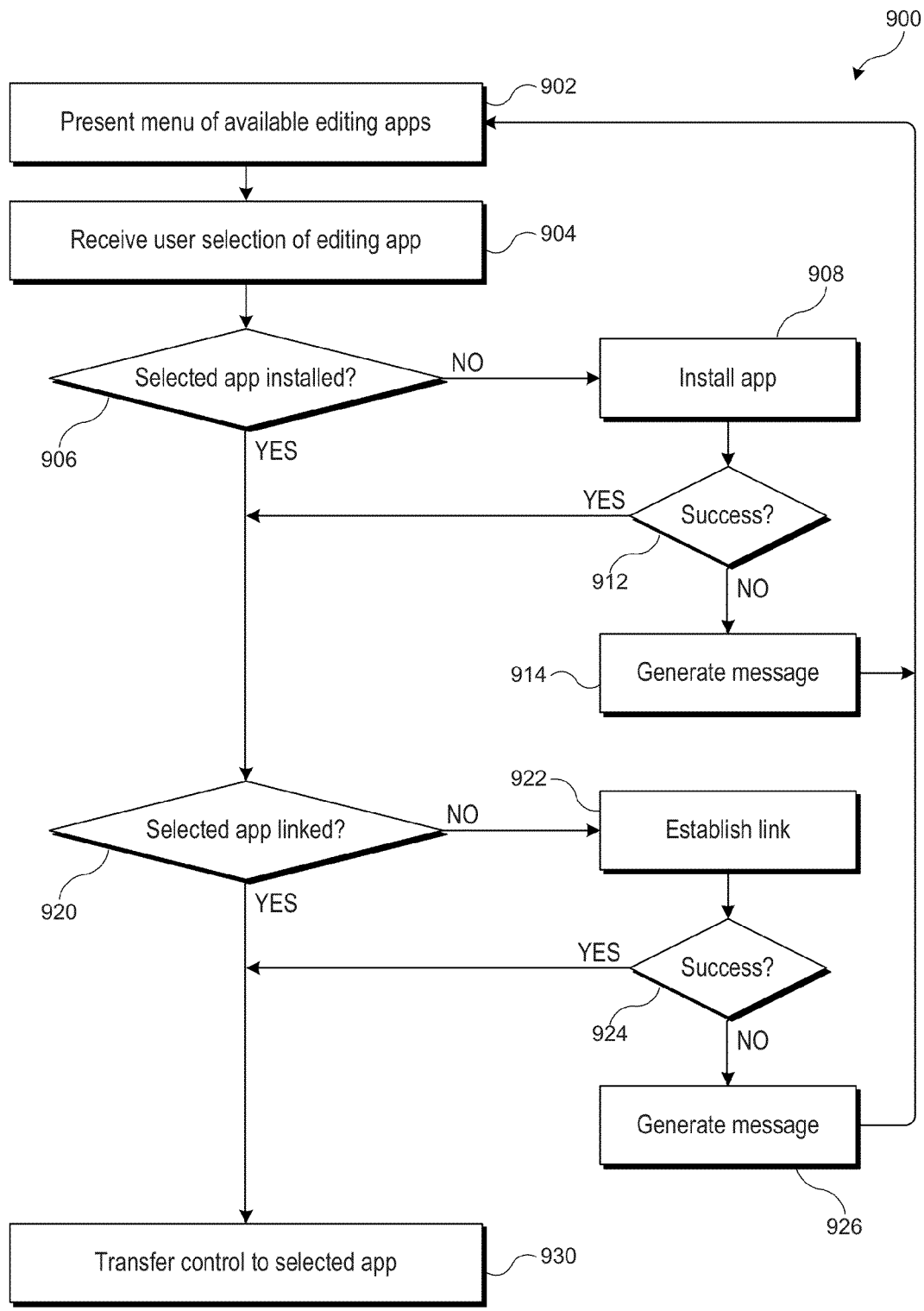
FIG. 9 shows a flow diagram of a process for selecting an editing app according to an embodiment of the present invention.

As described above, at block 806 of process 800, the user can select an editing app, e.g., using app chooser interface 502 of FIG. 5. FIG. 9 shows a flow diagram of a process 900 for selecting an editing app according to an embodiment of the present invention. Process 900 can be implemented in a client app (e.g., app 132 of FIG. 1) and can be executed, e.g., as all or part of block 806 of process 800.

Process 900 can begin when the user has indicated a desire to edit a particular content item. At block 902, the client app can present a menu of available apps. In some embodiments, the menu can be presented as app chooser interface 502 of FIG. 5; other formats and interfaces can also be used. At block 904, the user can select one of the apps from the menu as the editing app to be used.

In some embodiments, an editing app that is presented in the menu might or might not already be installed on the client device. For instance, as described above with reference to FIG. 5, the menu can include a group 508 of recommended apps that might not be currently installed. At block 906, if the selected editing app is not installed, then at block 908, process 900 can invoke an app installer to install the app. In some instances, block 908 may include acquiring the app from an online app source (including purchasing, downloading, and/or installing the app). When the app installer returns control to process 900, at block 912, process 900 can determine whether the app was successfully installed. If not, then at block 914 process 900 can generate an error message to the user. After displaying the error message, process 900 can return to block 902 to allow the user to make another selection. In some embodiments, process 900 can provide other options, such as retrying the installation or cancelling the edit operation.

At block 920, if the editing app was previously installed (block 906) or was successfully installed (block 912), process 900 can determine whether the editing app is linked to the user's account on online content management service 100. In some embodiments, process 900 can determine whether the editing app is linked based on link information 160 as described above. In some embodiments, process 900 can determine whether the editing app is linked by querying the editing app using any app-to-app communication mechanism supported by the platform on which the client app is executing. In some embodiments, process 900 can determine whether the editing app is linked by querying a table of linked apps maintained locally on the client device.

If the editing app is not linked, then at block 922, process 900 can prompt the user to link the editing app to the user's account at the online content management service. For example, the user can be prompted to enter account credentials (e.g., user ID and password) associated with her account, and process 900 can verify the credentials, e.g., by communicating with online content management service 100 or by referencing a copy of the credentials stored in association with the client app. In some embodiments, process 900 can communicate with online content management service 100 to update the user's account record 152 to add the newly-linked app to link information 160. In some embodiments, process 900 can communicate with the editing app to establish the link (e.g., updating state information maintained by the editing app). In some embodiments, process 900 can update a table of linked apps maintained locally on the client device to indicate that the editing app is now linked.

In some embodiments, the client app may allow only editing apps that are linked to edit content items that are stored on the online content management service. Accordingly, at block 924, if the user declines to link the app, or if the attempt to link fails, process 900 can generate an error message to the user at block 926. After displaying the error message, process 900 can return to block 902 to allow the user to make another selection. In some embodiments, process 900 can provide other options, such as retrying the linking or cancelling the edit operation.

In some embodiments, linking the editing app to the online content management system can be optional. For example, the client app (and online content management service 100) can treat the fact that the user selected a particular editing app for use with a particular content item as an implicit authorization to allow access to that item by the selected editing app. In some embodiments, an editing app that is not linked may be allowed to access only content items that the user has expressly chosen to edit with that app. In some embodiments, the client app may establish a link to the editing app automatically when the user selects the editing app at block 904, and prompting the user to establish a link at block 922 can be omitted (or the prompt can be a simple "OK" without requiring the user to enter account credentials).

At block 930, once the selected editing app is installed and linked (or otherwise authorized), process 900 can transfer control to the editing app. In some embodiments, block 930 can be similar or identical to block 808 of process 800 described above.

It will be appreciated that the app chooser process of FIG. 9 is illustrative and that variations and modifications are possible. Steps described as sequential may be executed in parallel, order of steps may be varied, and steps may be modified, combined, added or omitted. For instance, integrating installation and linking of editing apps into the app chooser process can be convenient for the user but is not required.

In some embodiments, the app chooser may offer the option to search for additional apps (e.g., by accessing an online app source); this can be implemented, e.g., using more button 510 of FIG. 5. If the user selects this option rather than selecting one of the linked, installed, or recommended apps, the client app can transfer control to a program that accesses the online app source. Once the user has obtained and installed an app from the app service, control can be transferred back to the client app. At that point, the client app can continue process 900, e.g., by presenting an updated menu at block 902 that includes the newly installed app. The newly installed app can be highlighted or set as a default choice if desired.

Processes 800 and 900 can end when the client app transfers control to the selected editing app. In some embodiments the client app can continue to execute, e.g., as a background process after transferring control. In some embodiments, the client app can exit; state information can be stored to allow the client app to resume execution where it left off.

Figure 10:
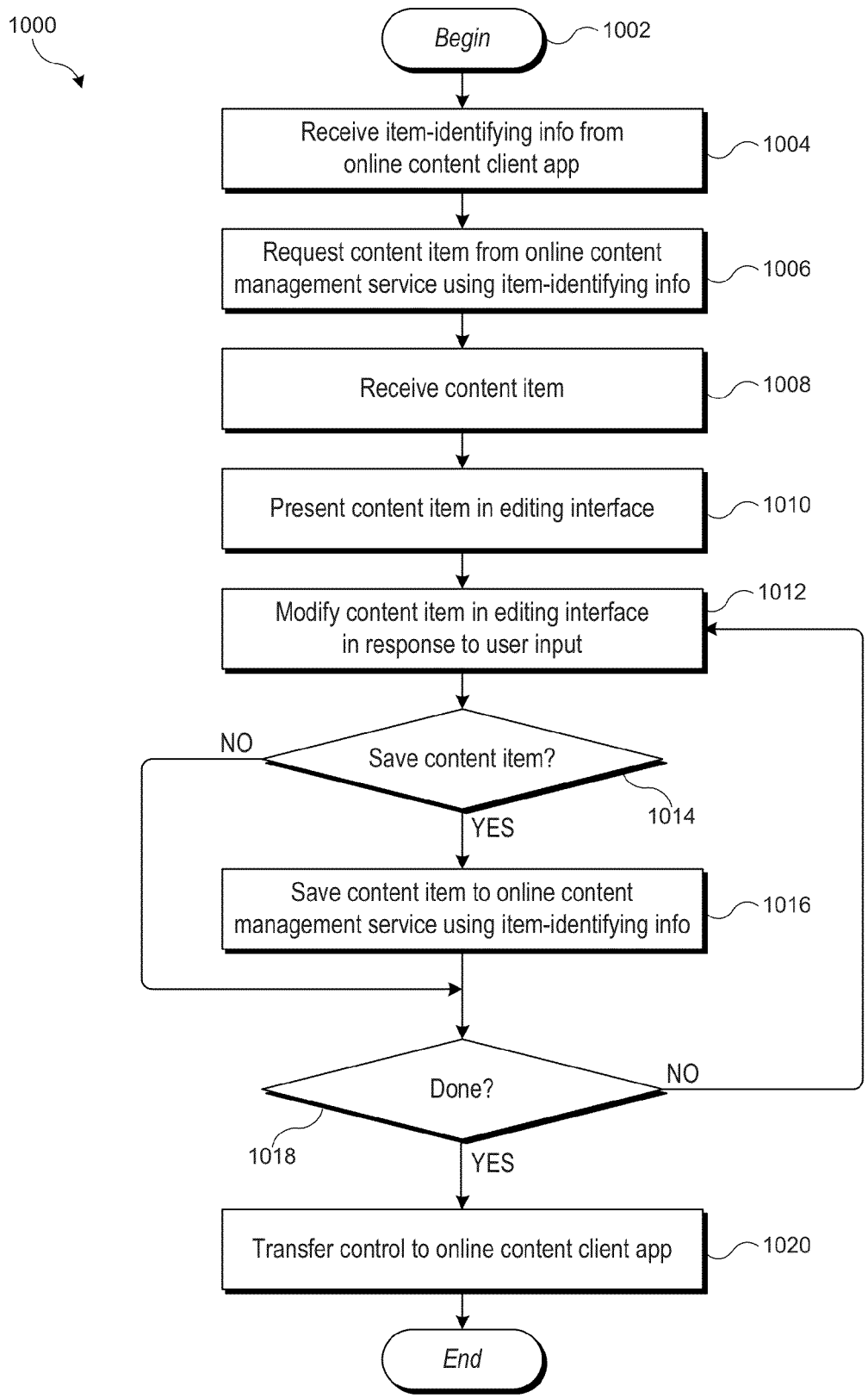
FIG. 10 shows a flow diagram of a process for editing a content item that is stored at an online content management service according to an embodiment of the present invention.

FIG. 10 shows a flow diagram of a process 1000 for editing a content item that is stored at an online content management service according to an embodiment of the present invention. Process 1000 can be implemented, e.g., in an editing app for content items of a particular type, such as any of apps 124, 126, 128, 136, 138, 144, 146.

Process 1000 begins at block 1002 when the client app transfers control to the editing app (e.g., from process 800 or 900). At block 1004, the editing app reads the item-identifying information provided by the client app. For example, the editing app can parse the URL resource handler described above to determine that online content management service 100 is the host for the content item and to extract item-identifying information (e.g., user ID and item ID). At block 1006, the editing app can request the content item from online content management service 100 using the item-identifying information. At block 1008, the editing app can receive a copy of the requested content item, e.g., in working memory or other local storage.

At block 1010, the editing app can present the content item in its editing interface, e.g., interface 600 shown in FIG. 6. At block 1012, the user can edit the document by interacting with the editing interface. Depending on the particular editing app and type of content item, a wide range of editing operations can be supported, including but not limited to: adding, deleting, or modifying text; changing colors, formats, sizes, and other properties of graphical objects or pixels; modifying audio content; changing metadata; encrypting and/or decrypting content; adding or changing a digital signature; and so on.

At block 1014, the editing app can determine whether the content item should be saved. In some embodiments, a content item can be saved in response to user input (e.g., selecting save button 610 or done button 612 of FIG. 6). In some embodiments, the editing app may automatically save the content item at regular intervals. If block 1014 results in a determination that the content item should be saved, then at block 1016, the editing app can save the content item to the online content management service. For example, the editing app can send a modify instruction to the online content management service; the modify instruction can include the item-identifying information from block 1004 and the modified content. Other communication protocols and techniques can be used. In some embodiments, the editing app can send a complete version of the content item that replaces the previous version on content management service 100. In some embodiments, the editing app can send data corresponding to modified sections of the content item rather than the whole item (e.g., if metadata is to be modified), and the online content management service can update the item accordingly. Other techniques can also be used.

At 1018, the editing app can determine whether the editing operation is done. For example, the editing app can detect user operation of done button 612 of FIG. 6. If the operation is not done, process 1000 can return to block 1012 for further editing.

Once the editing operation is done at block 1018, then at block 1020, the editing app can return control to the client app. On returning control, the editing app can provide information to the client app confirming that the editing occurred. For example, in some embodiments, the editing app can transfer control by providing a URL for the client app; standard URL syntax may be used. In some embodiments, the URL can include a resource handler indicating that the editing operation is done and including item-identifying information for the content item that was edited. For example, the URL can have the format:

prot://clientapp.location/
ocms_edit_done?userID=uuu&itemID=nnn&editapp=ppp where "clientapp.location" is the location of the client app, and the resource handler identifies the item that was edited and the app that was used for editing. Other formats can also be used.

In other embodiments, an editing app executing on a given client device can transfer control to an online content client app on the same device by providing a suitably formatted command string to the operating system of the client device. The command string can include parameters (e.g., a userID, an itemID, an app ID) that can be delivered to the client app to identify the editing app and the edited content item.

In still other embodiments, if the operating system supports data transfer between applications, the editing app can transfer its copy of the edited content item to the client app, and the client app can, in turn, synchronize the edited content item to the online content management service. Other techniques can also be used, depending on how a particular platform implements allowing an executing app to invoke another app.

When control is returned to the online content client app, process 1000 can end. In some embodiments, the editing app can exit; in other embodiments, the editing app can continue to execute as a background process. In the latter case, the editing app can close the content item (e.g., delete it from its working memory or change the interface state such that the content item no longer appears as an editable item).

When control is returned to the online content client app, the client app can generate an alert indicating that the edit occurred, e.g., as shown in FIG. 7. This alert can be based on information provided by the editing app and/or information received from the online content management service alerting the client app to the update.

It will be appreciated that the editing workflow and processes of FIGS. 3-10 are illustrative and that variations and modifications are possible. Steps described as sequential may be executed in parallel, order of steps may be varied, and steps may be modified, combined, added or omitted. For instance, computing platforms may vary in regard to communication between applications, and the specific mechanisms by which a client app invokes an editing app and by which the editing app returns control to the client app can be optimized for a specific platform. The selection of an editing app can involve more or fewer options, or different options, than those described herein, and the number of available editing apps may depend on the content type, platform, and/or which apps are installed on a particular user device.

As noted above, the term "editing" can encompass a wide variety of operations on a content item, and these operations might or might not modify the item's content and/or metadata. In addition to or instead of editing, other operations on content items can be supported using the processes described above or similar processes.

One example is ordering prints of a content item such as a photo. Various apps (e.g., photo ordering app 140 of FIG. 1) can allow a user to select a photo and identify an article on which the photo should be printed. For example, the user may be able to order prints on photo-quality paper, T-shirts, banners, coffee mugs, or the like. An ordering app may allow the user to select a location for picking up the printed articles or to request delivery of the articles. An ordering app can provide various other features such as an interface for locating stores that can make prints, pricing information, and interfaces for specifying print options such as size and quantity.

Figure 11:
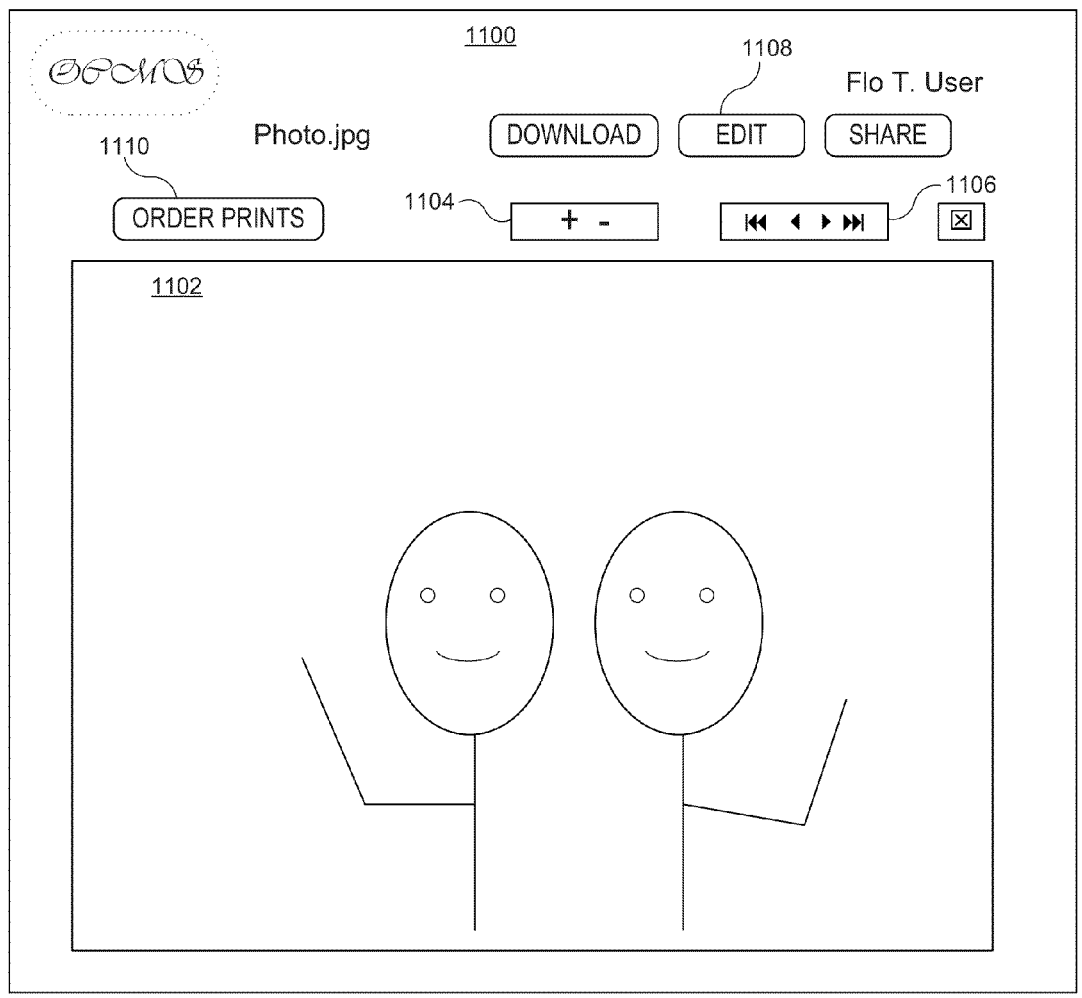
FIG. 11 shows an interface for viewing an image according to an embodiment of the invention.

Some embodiments of the present invention can allow a user to order prints made from one or more selected content items using an ordering app (e.g., photo ordering app 140). For example, FIG. 11 shows an interface 1100 according to an embodiment of the invention. Interface 1100 can be implemented, e.g., as a photo-preview interface for a client app such as client app 136 of FIG. 1. Interface 1100 can allow the user to select apps for ordering articles or modifying an image.

Interface 1100 can include a display area 1102 to display an image (e.g., a photo) stored on online content management service 100. Interface 1100 can include various image manipulation controls, such as zoom controls 1104 that allow the user to change the size of the displayed image and/or navigation controls 1106 that allow the user to view different images from a group (e.g., different images in the same folder).

In some embodiments, interface 1100 can also include controls that allow the user to invoke apps to interact with the displayed content item. For example, edit button 1108 can be used to invoke a photo editor to edit the image. If the user selects edit button 1108, a menu of photo editing apps can be presented; this can be similar to app chooser interface 502 of FIG. 5, although the selection of apps presented can be different (e.g., apps for editing photos rather than apps for editing text). The workflow can be generally similar to that described above, and similar processes can be used in the client app and the editing app to implement the workflow.

As another example, "order" button 1110 can be used to invoke an ordering app to order articles printed with the image. If the user selects order button 1110, a menu of ordering apps can be presented; this can be similar to app chooser interface 502 of FIG. 5, although the selection of apps presented can be different. In general, the workflow can be similar to that described above, and similar processes can be used in the client app and the ordering app (acting analogously to an editing app, although some ordering apps might not modify the content items) to implement the workflow.

It should be noted that, in relation to the workflows and processes described herein, the distinction between an "editing" app and an "ordering" app is artificial. Either class of app can be invoked from a client app and provided with a reference to a specific online content item on which it is to operate. Either class of app can present the content item to the user, perform any operations it supports on or with the content item, and (if any changes are made) save the content item back to the online content management system, then return control to the client app. Thus, an editing app or an ordering app can be understood as examples within a broader class of "operating" apps that perform operations on content items.

Although the workflows can be the same, presenting the user with separate controls for different classes of operations (e.g., edit button 1108 and order button 1110) can be a user-friendly design choice. For example, ordering apps may provide little or no editing capability, and editing apps may provide little or no capability for ordering articles made from the content item. If the user can indicate a desired intent (e.g., by selecting either edit or order), the menu of operating apps presented to the user can be tailored to that intent (e.g., by presenting only editing apps if the user indicates intent to edit or only ordering apps if the user indicates intent to place an order).

In some instances, presenting separate controls for different classes of operations can facilitate partnering between a provider of the online content management service and providers of other services. For example, in some embodiments order button 1110 can automatically launch an ordering app associated with a preferred service provider, rather than first presenting an app chooser. In some embodiments, the user can be given the option to use the preferred provider's app or select another app. Where separate controls are provided for different classes of operations, the provider of the online content management service can partner with different preferred providers for different classes of operations.

Options for different classes of operations can be provided, e.g., by providing a separate user-operable control for each class (e.g., as shown in FIG. 11), or by providing a generic "open with . . . " control. In some embodiments, a generic control can launch a menu of all available apps, e.g., grouped according to supported class(es) of operations, such as editing, ordering, or digitally signing. In other embodiments, a generic control can open a dialog box where the user can select one or more classes of operations to be performed, and an app chooser menu can be generated based on the user's selection.

Figure 12:
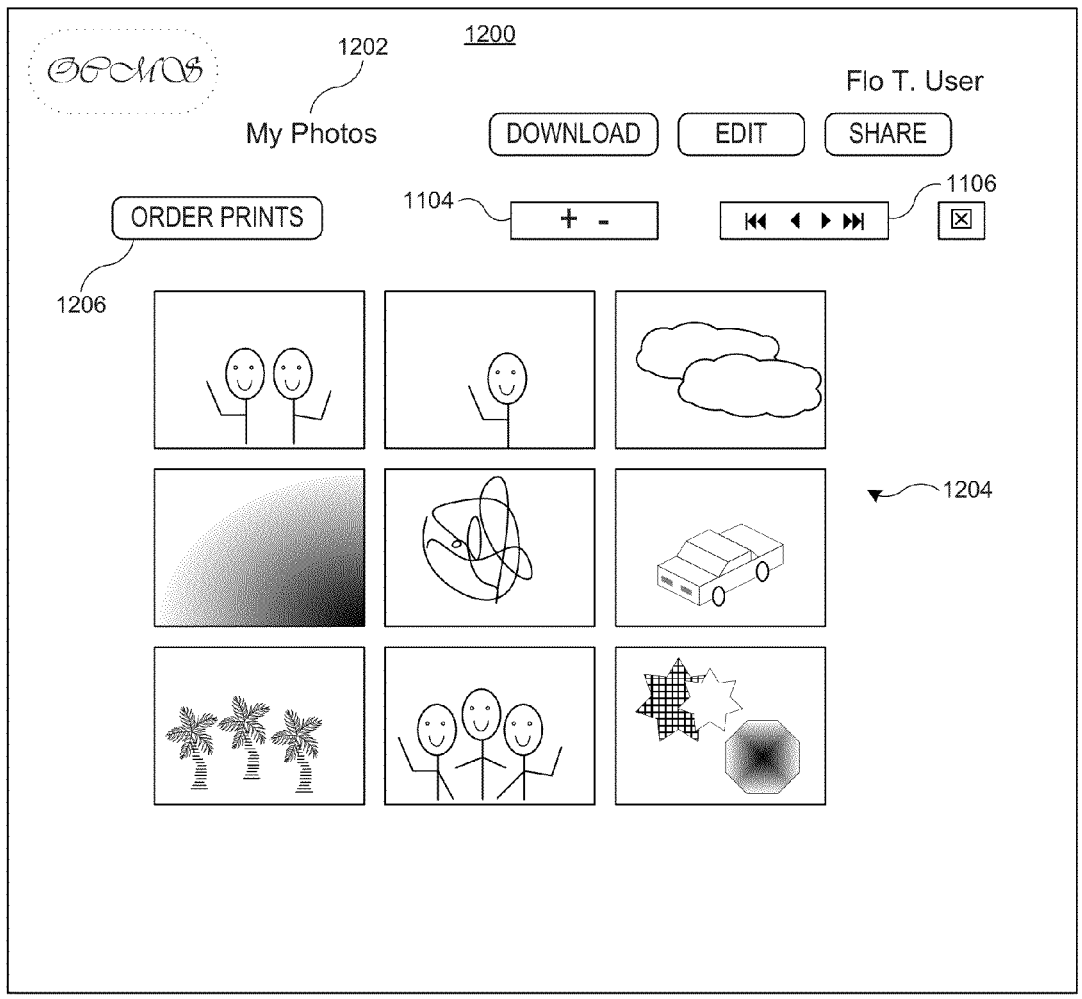
FIG. 12 shows an interface for viewing multiple images according to an embodiment of the present invention.

In some embodiments, an operating app can be invoked to operate on a group of online content items. For example, a user may wish to order a set of prints of all photos (or other images) from a particular folder on online content management service 100. FIG. 12 shows an interface 1200 for viewing multiple photos (or other images) according to an embodiment of the present invention. Interface 1200 includes a label area 1202, e.g., identifying a folder that contains photos and a grid area 1204 where the photos can be displayed (sometimes although not necessarily at reduced size). The grid can be regular or irregular, depending on the sizes of different photos. In some embodiments, a user can click on or touch a photo in grid area 1204 to bring up a larger view (e.g., similar to interface 1100 of FIG. 11).

Interface 1200 can include an order button 1206 that can invoke a menu of ordering apps, e.g., as described above with reference to FIG. 11. (In some instances, the order button can directly invoke a preferred ordering app.) In some embodiments, ordering apps invoked via button 1206 can be limited to apps that are capable of operating on a folder as a content item. For example, an ordering app may be able to receive a reference to a folder containing image files and can allow the user to order one or more sets of prints of all images in the folder.

As the foregoing examples illustrate, an online content client app can invoke a variety of operating apps to perform various operations on a content item (or in some instances sets of content items) stored in the online content management service. Examples of operations include editing or otherwise modifying a content item, printing a content item, placing orders (e.g., for merchandise) related to a content item, digitally signing a content item, encrypting or decrypting a content item, converting a content item to a different format, sending a content item to a destination (e.g., using an email or messaging app), and so on. A given instance of a given operation might or might not actually modify the content or metadata of the item on which the operation is performed.

In embodiments described above, an operating workflow begins from within a client app (e.g., any of apps 132, 136, 144 of FIG. 1). However, this is not required; in some embodiments an operating workflow can begin from within an operating app, such as an editing app.

Figure 13:
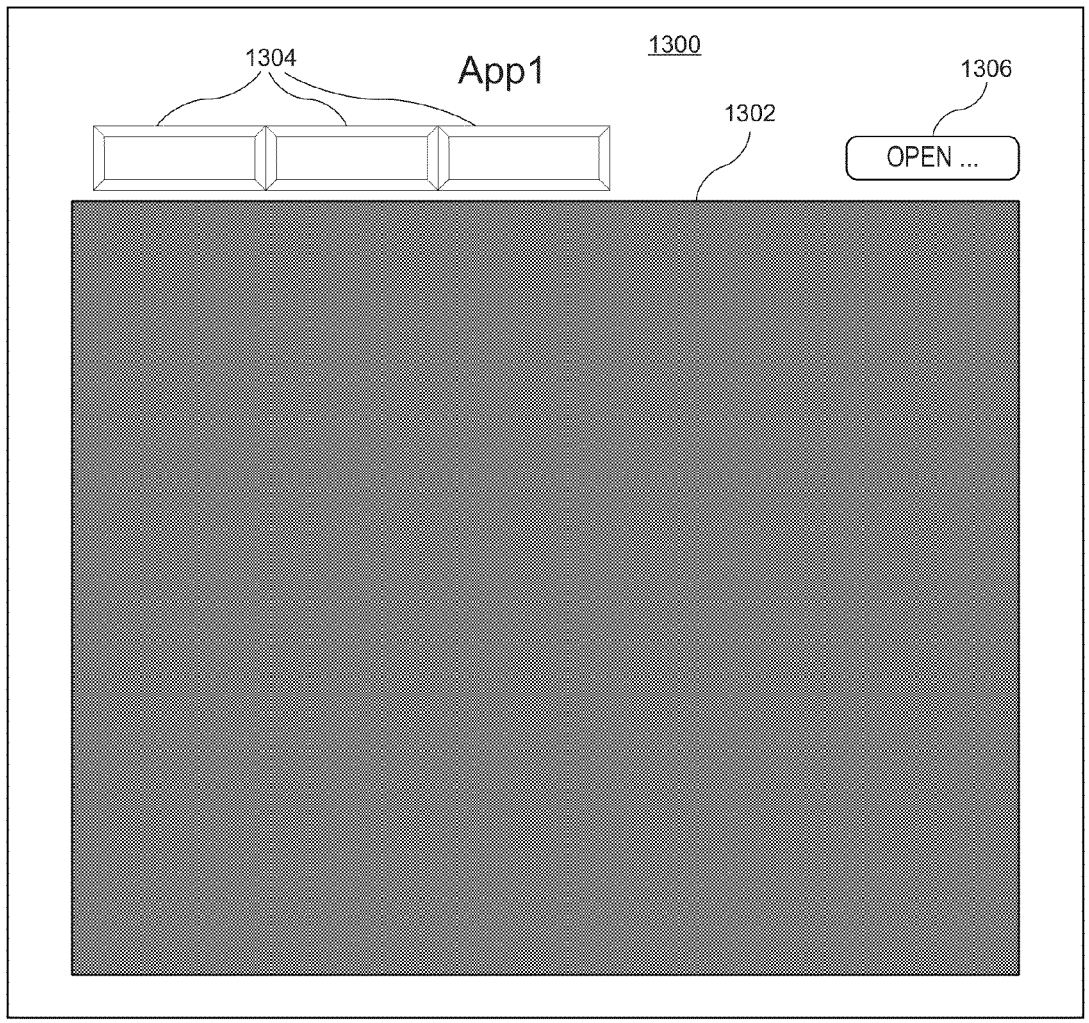
FIG. 13 shows an interface for an editing app according to an embodiment of the present invention.

For example, FIG. 13 shows an interface 1300 for an editing app according to an embodiment of the present invention. Interface 1300 can be generally similar to interface 600 of FIG. 6A, except that in this example, no content item is currently opened for editing. Accordingly, editing region 1302 can be grayed out. Some or all of editing controls 1304 can also be rendered in a manner that indicates that they are inactive (e.g., grayed out or hidden). An open button 1306 can be provided to allow a user to select a content item to be opened for editing in the editing app.

Figure 14:
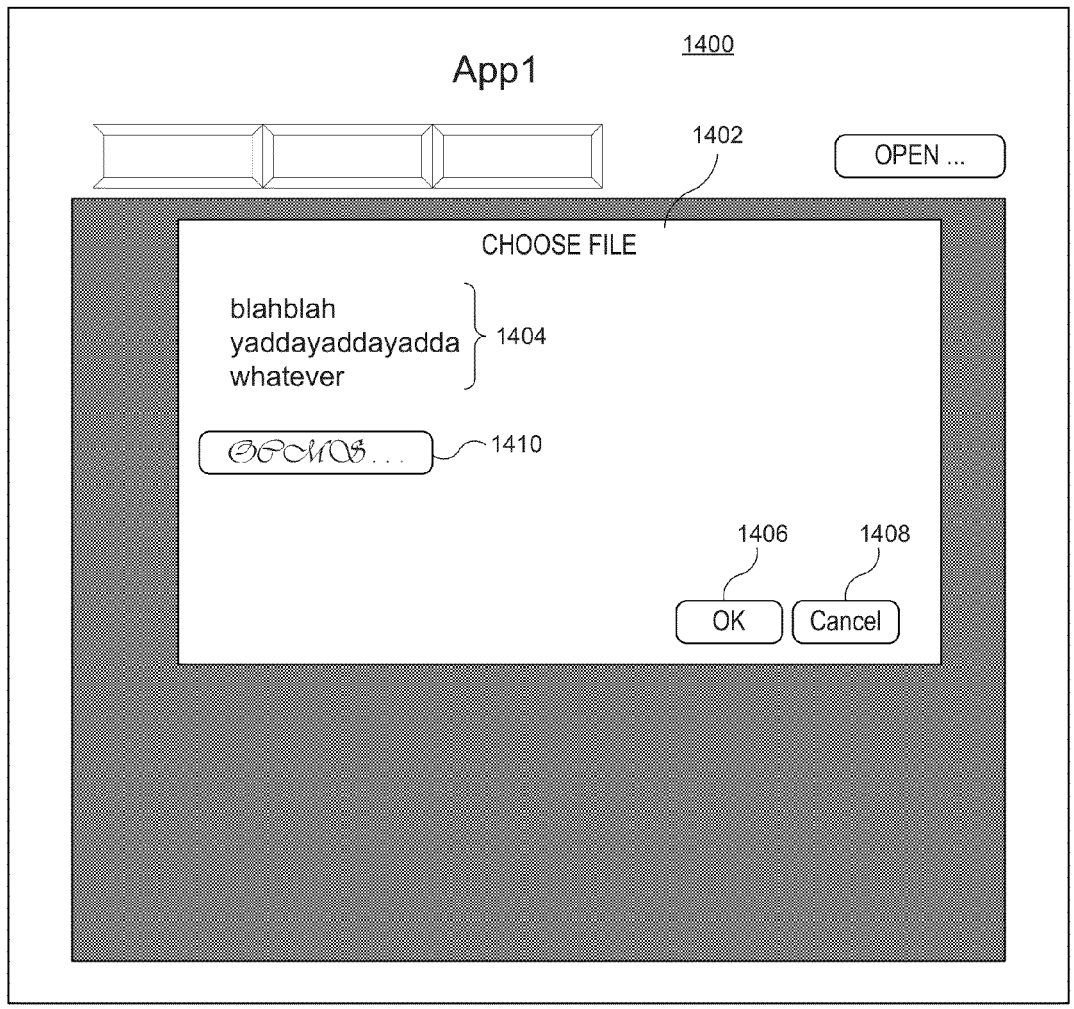
FIG. 14 shows an interface with a file selection dialog box according to an embodiment of the present invention.

In some embodiments, when the user operates open button 1306, a file selection dialog box 1402 can be opened, e.g., as shown in interface 1400 of FIG. 14. File selection dialog box 1402 can list files 1404 that are available on the client device; the files can be presented as selectable objects, and the user can select one, e.g., by double-clicking on its name or by selecting the name and then operating "OK" button 1406. Cancel button 1408 can be operated to close choose file dialog box 1402 without selecting a content item, in which case interface 1400 can revert to interface 1300.

Dialog box 1402 can include a control 1410 operable to select a file from the online content management service. In some embodiments, control 1410 is displayed only if the editing app is linked to a user's account on online content management service 100. In some embodiments, if the editing app is not linked when a user selects control 1410, the editing app can generate a prompt to the user to link the app (e.g., prompting the user to enter account credentials).

Figure 15:
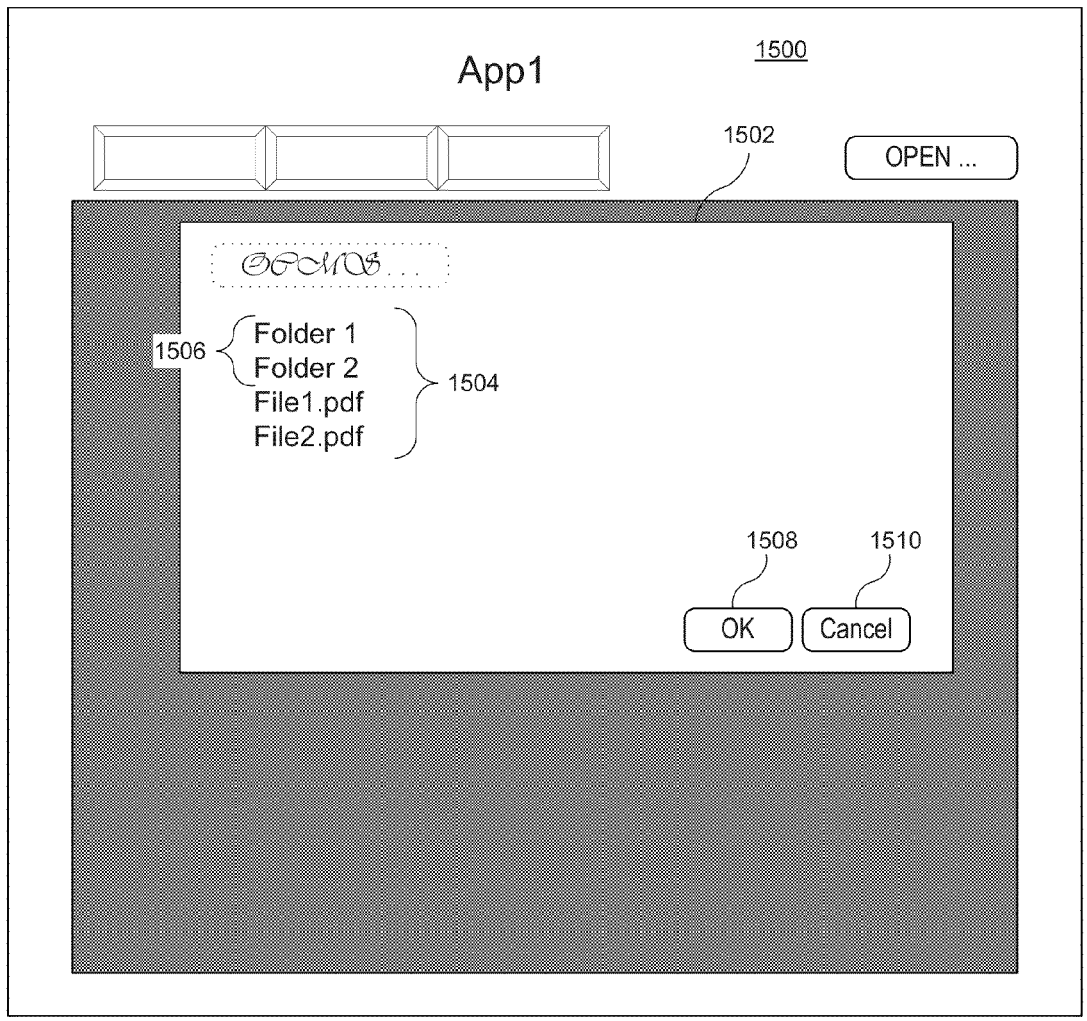
FIG. 15 shows a content item chooser interface according to an embodiment of the present invention.

When the user operates control 1410, a content-item chooser can be launched. FIG. 15 shows a content item chooser interface 1502 displayed as an overlay on editing app interface 1500 according to an embodiment of the present invention. Editing app interface 1500 can be similar to interface 1300. Content item chooser interface 1502 can present a list 1504 of content items associated with the user's account on online content management service 100. The list can be filtered based on the file type (or types) that are known to be editable by the editing app. In some embodiments, the list can also include folders (e.g., at 1506), and the user can select a folder to view a list of content items contained therein. Accordingly, the user can operate content item chooser 1502 to select a content item to be edited. OK button 1508 and cancel button 1510 can operate similarly to OK button 1406 and cancel button 1408 of FIG. 14. When a content item is selected, the content item can be opened in the editing app; the resulting interface can be similar to that shown in FIG. 6.

In some embodiments, chooser interface 1502 can be provided and managed by online content management service 100. For example, online content management service 100 can provide a chooser API that can be called by the editing app to launch chooser interface 1502. The API call can allow the editing app to specify information such as which file types are of interest and an identifier of the user for whom the chooser is being presented. In some embodiments, the chooser API controls the rendering of chooser 1502 and interpretation of user input. When a content item is selected, the chooser API can return item-identifying information to the editing app, which can then request the item from online content management service 100.

Figure 16:
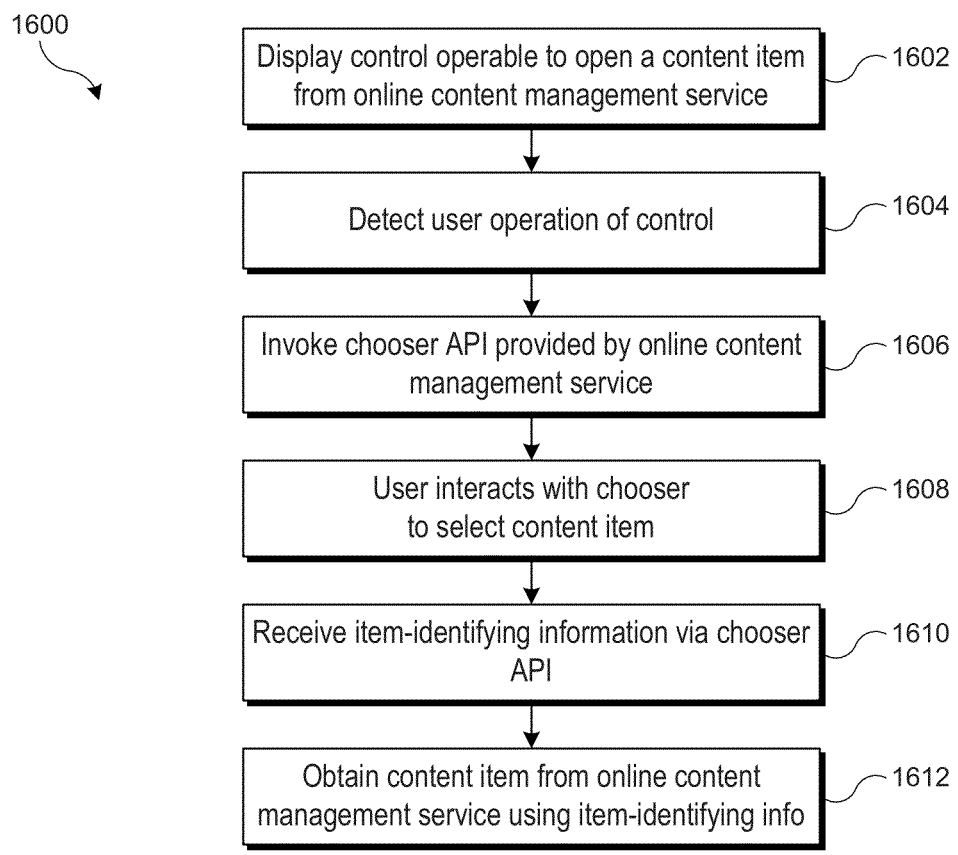
FIG. 16 shows a flow diagram of a process for opening a content item in an editing app according to an embodiment of the present invention.

FIG. 16 shows a flow diagram of a process 1600 for opening a content item in an editing app according to an embodiment of the present invention. Process 1600 can be implemented in an editing app or other operating app.

At block 1602, the editing app can display a control operable to open a content item from an online content management service (e.g., control 1410 of FIG. 14). When the user operates this control (block 1604), the editing app can call a chooser API provided by the provider of online content management service 100 (block 1606). At block 1608, the user can interact with a chooser interface (e.g., chooser interface 1502 of FIG. 15) to select a content item from the online content management service. As noted above, chooser interface 1502 can be managed through the chooser API. In some embodiments, the chooser API can include code that renders chooser interface 1502 and code that interprets user input data when the user interacts with chooser interface 1502. In some embodiments, the chooser API can return information to the editing app that the app can use to render chooser interface 1502 and interpret the user input.

Once the user has selected a content item at block 1608, the editing app can receive item-identifying information via the chooser API at block 1610. At block 1612, the editing app can communicate with the online content management service using the item-identifying information to request the item. This can be similar or identical to block 1006 of process 1000 of FIG. 10, and once the item is requested, the editing app can proceed using the rest of process 1000 or similar processes. Thus, the user can edit the content item and save the edited item back to the online content management service (e.g., replacing the item that was retrieved for editing).

It will be appreciated that the file-opening process and interfaces of FIGS. 14-16 are illustrative and that variations and modifications are possible. Steps described as sequential may be executed in parallel, order of steps may be varied, and steps may be modified, combined, added or omitted. For instance, the item-chooser interface can be different from the example shown, and the division of activity between the chooser API and the editing app can be varied.

It should be noted that some editing apps may allow multiple content items to be open concurrently. For example, an open control such as button 1306 of FIG. 13 can be presented to the user while one (or more) content items is already open, allowing the user to open another content item. Each open content item can be independently edited, saved, and closed. Content items that are stored on online content management service 100 can be edited and saved using process 1000 or similar processes. In some embodiments, local and online content items can be concurrently open in an editing app.

In addition to modifying or operating on existing content items, a user may want to create a new content item to be stored on online content management system 100. In some embodiments, this can be done using an online content client app interacting with an editing app (or other operating app).

Figure 17:
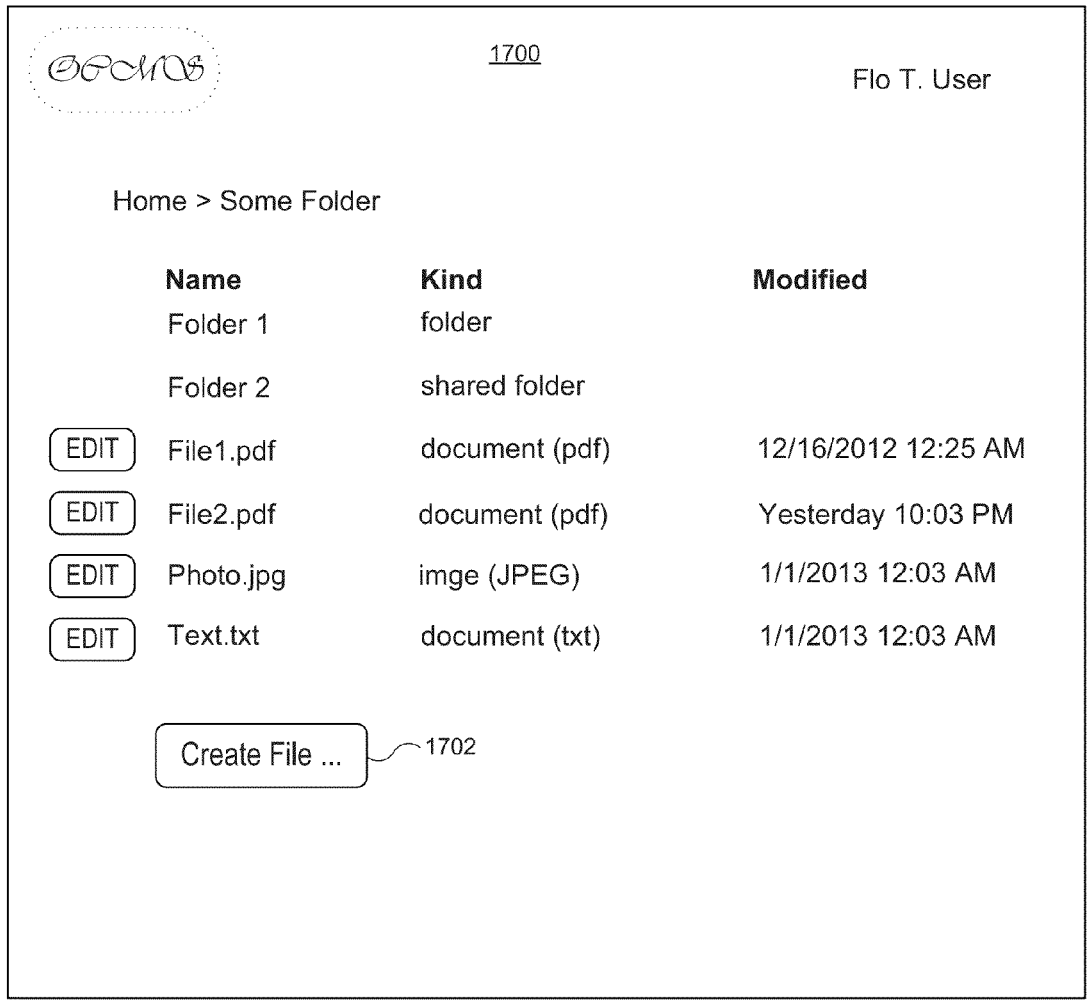
FIG. 17 shows a user interface for a client app according to an embodiment of the present invention.

For example, FIG. 17 shows a user interface 1700 for a client app (e.g., client app 132 of FIG. 1) according to an embodiment of the present invention. Interface 1700 can be generally similar to interface 300 of FIG. 3. Interface 1700 can include a control 1702 that is operable to initiate a process for creating a new file.

Figure 18:
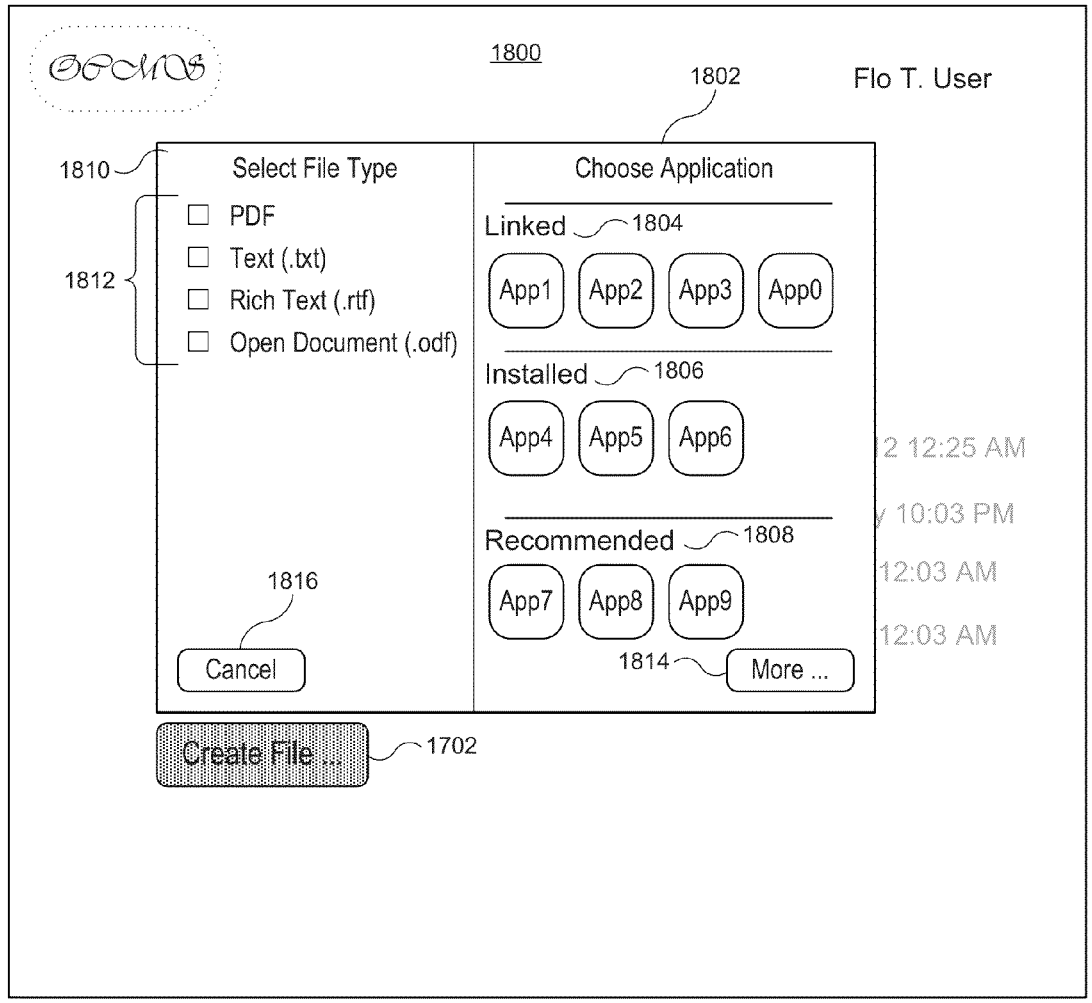
FIG. 18 shows an app chooser interface according to an embodiment of the present invention.

User operation of control 1702 can result in displaying an app chooser, allowing the user to select an operating app with which the new file should be created. Any app capable of creating a new file can be used. FIG. 18 shows an app chooser interface 1802 according to an embodiment of the present invention. In this embodiment, app chooser interface 1802 appears as an overlay on interface 1700 when a user operates control 1702.

App chooser interface 1802 can be similar to app chooser 502 of FIG. 5, with apps grouped based on whether they are linked (group 1804), installed (group 1806), or recommended (group 1808). In the case of creating a new item, however, the content type of the new item might not be known, and interface 1802 can present all apps without regard for content types. In some embodiments, app chooser interface 1802 can include a file type selection dialog 1810. The user can select a file type, e.g., by checking one of boxes 1812, and the app chooser can automatically filter the list of apps based on the selected file type. For example, if the user selects "Text," the list of apps can be reduced to show only apps capable of creating a text file. In some embodiments, the user can select multiple file types at once, and apps capable of creating any one (or more) of the selected file types can be listed. Some embodiments may provide other options for locating and selecting an operating app, such as searching for apps by name, tags, or descriptions; viewing an alphabetical list of all installed apps; or the like. Some embodiments can allow the user to access an online app source to find and download an app (e.g., via control 1814); this option can be similar to options described above with reference to FIGS. 5 and 9.

A cancel button 1816 can allow the user to cancel the new-item operation and return to interface 1700.

Figure 19:
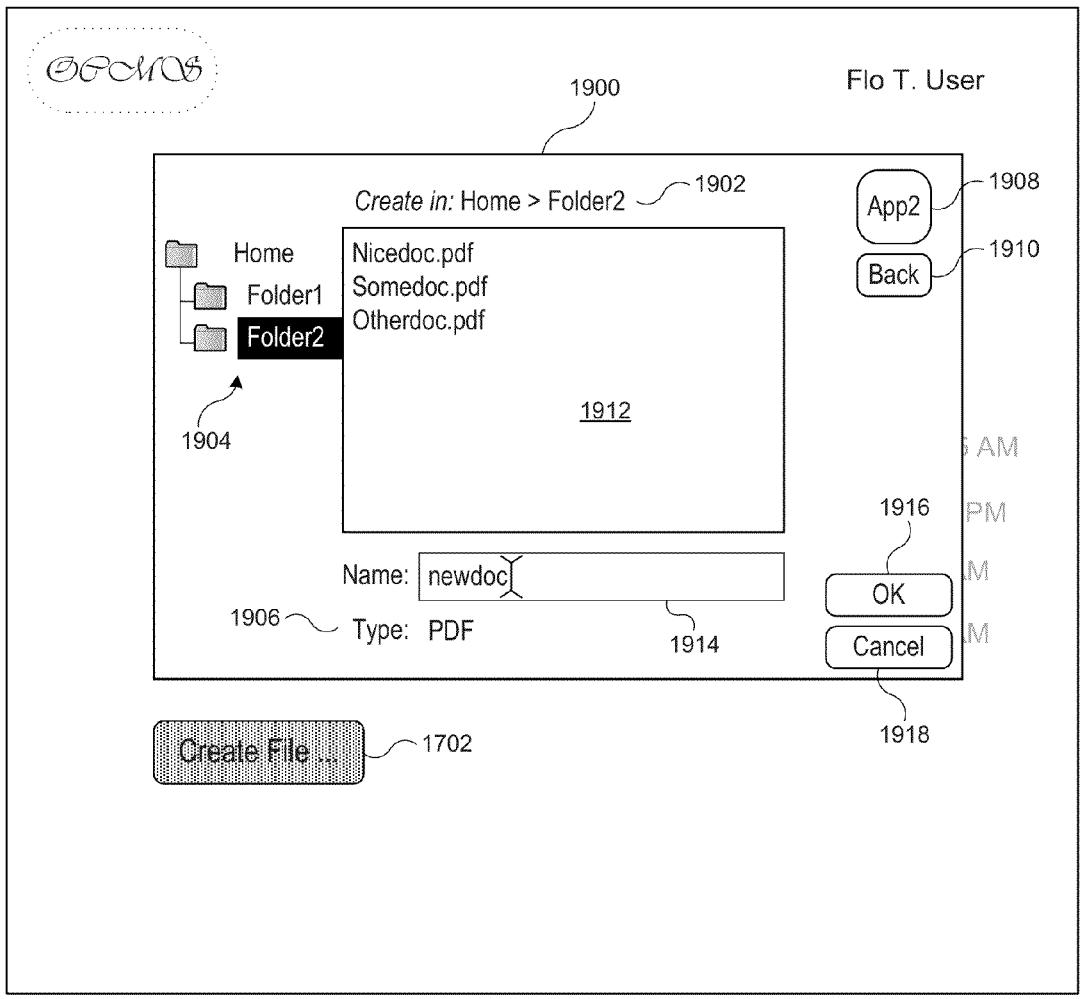
FIG. 19 shows a file naming interface according to an embodiment of the present invention.

If the user selects an app using interface 1802, a file naming interface can be displayed. FIG. 19 shows an example of a file naming interface 1900 according to an embodiment of the present invention. In some embodiments, naming interface 1900 can appear as an overlay on interface 1700 of FIG. 17, e.g., replacing interface 1802. (There can be an animated transition, such as rotate or wipe, from interface 1802 to interface 1900.)

Naming interface 1900 can present a path to the new file, e.g., in area 1902. The path can be defined within the user's folder hierarchy on online content management service 100. In some embodiments, the path can default to the user's home folder, or to the folder from which the user invoked the new file creation. Naming interface 1900 can allow the user to change the path, e.g., by browsing and selecting a folder from navigation area 1904.

Naming interface 1900 can include visual indicia to remind the user of the file type 1906 and selected app 1908. A back button 1910 can allow the user to return to app chooser interface 1802 to select a different app.

Region 1912 can display a list of content items in the currently selected folder. In some embodiments, the content items can be filtered based on file type, e.g., showing only items that match selected file type 1906. In some embodiments, any folders within the currently selected folder are also displayed in region 1912, and this can facilitate changing the path by navigating down the hierarchy. Other navigation controls (not shown) can also be provided to assist the user in identifying the path to the new content item. In some embodiments, interface 1902 may allow the user to create a new folder within the currently selected folder.

Text box 1914 can be provided to allow the user to enter a name for the new file. In some embodiments, a file type extension (e.g., ".pdf") can be automatically appended to the name and/or a default new file name can be automatically populated in box 1914. The user can enter a desired name or overwrite the default name. OK button 1916 can be operated to instruct the client app to proceed with creating the file using the current path and file name; cancel button 1918 can be operated to cancel the file creation operation and return to interface 1700.

When the user operates OK button 1916 (or otherwise indicates that the item name and path have been selected), the client app can send an instruction to online content management service 100 to create the new file, then transfer control to the editing app to allow the user to work with the new file. Editing app can launch with an interface similar to that of FIG. 6A or 6B; since the content item is new, editing area 604 can be initially empty or filled with a default new item as defined by the app.

Figure 20:
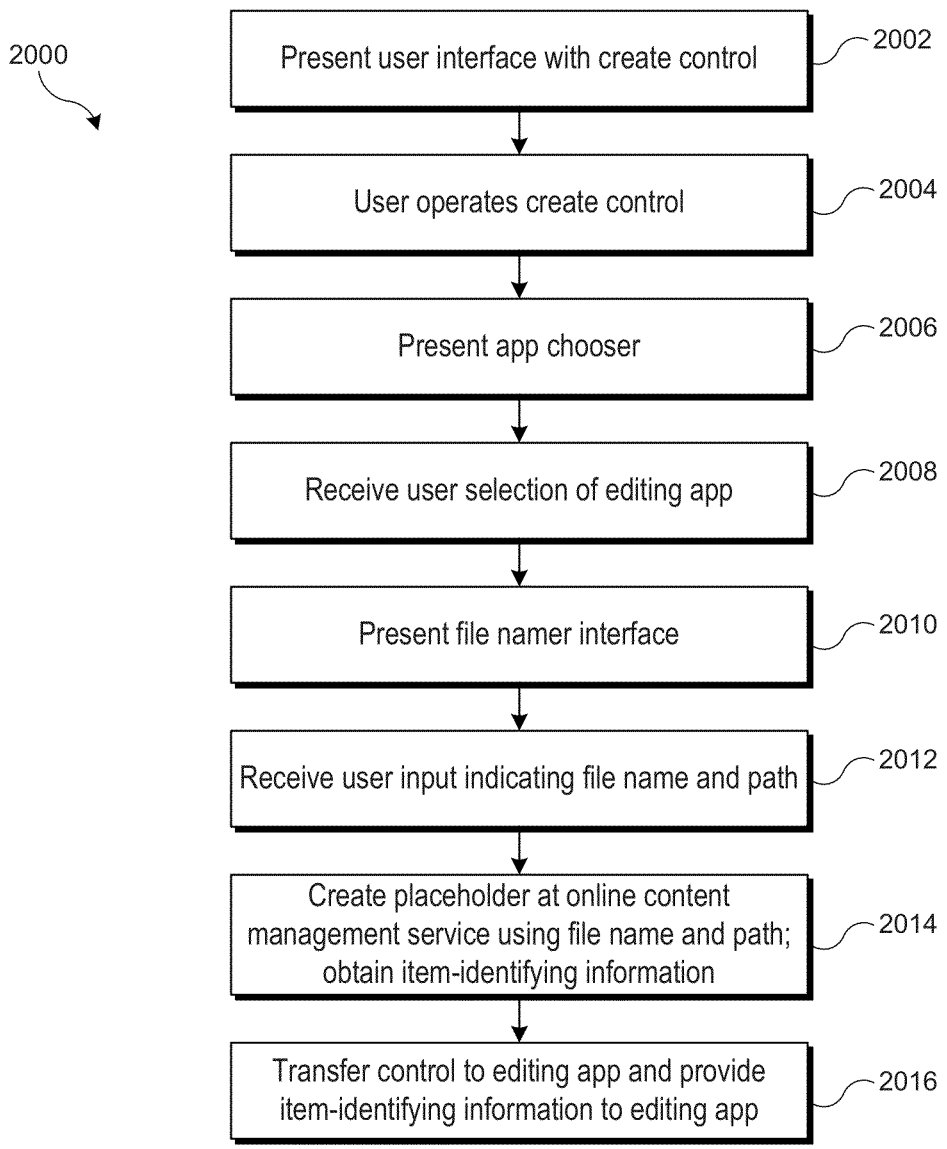
FIG. 20 is a flow diagram of a process for creating a new document according to an embodiment of the present invention.

FIG. 20 is a flow diagram of a process 2000 for creating a new document according to an embodiment of the present invention. Process 2000, can be implemented, e.g., in client app 132, 136, 144 of FIG. 1.

At block 2002, the client app can display a user interface that includes a "create" button, e.g., interface 1700 of FIG. 17, and at block 2004, the client app can detect that the user has selected the create button.

At block 2006, the client app can display an app chooser interface that allows the user to select an editing app to create the new content item. For example, app chooser interface 1802 of FIG. 18 can be presented. At block 2008, the client app can receive a user selection of an editing app via the app chooser interface. Operation of app chooser interface 1802 can use processes similar to process 900 of FIG. 9 and can include installing and/or linking an app if appropriate.

At block 2010, the client app can display a file naming interface that allows the user to select a name and path (or storage location) for the new content item. For example, interface 1900 of FIG. 19 can be used. At block 2012, the client app can receive the user's selection of a name and path.

At block 2014, the client app can instruct online content management service 100 to create a new content item using the selected name and path. Online client content management service 100 can, for instance, create an empty file that is associated with the name and path and assign an item identifier to it. Online content management service 100 can return the newly assigned item identifier to client app.

At block 2016, the client app can transfer control to the editing app. This can be generally similar to block 808 of process 800, and the client app can provide the item-identifying information to the editing app. In this instance, however, the client app can indicate that the editing app should create a new document rather than retrieving an existing document. For example, where URL resource handlers are used, a resource handler indicative of editing an existing content item (e.g., "ocms_edit" as described above) can be replaced with a different resource handler indicative of creating a new item (e.g., "ocms_new"). In some embodiments, e.g., where the editing app supports multiple file types, the resource handler can also indicate the selected file type of the new item. The client app can supply the item-identifying information for the new content item, and the editing app can use this information to save the new item to online content management service 100.

After transferring control at block 2016, process 2000 can end. In some embodiments, the client app can continue executing, e.g., as a background process, while the user edits the document using the editing app. Editing of the content item can proceed similarly to process 1000 of FIG. 10, with the content item being saved to online content management service 100 using the item-identifying information provided at block 2016. When editing is complete, control can be returned to the online content client app, e.g., as described above.

It will be appreciated that the document process described herein is illustrative and that variations and modifications are possible. Steps described as sequential may be executed in parallel, order of steps may be varied, and steps may be modified, combined, added or omitted. For instance, in some embodiments, invoking a "new" operation can simply open a new content item in an editing app without first prompting for a name and path, and the user can be prompted to provide a name and path for the new item at a later point, e.g., after adding content to the item and invoking a "save" operation in the editing app.

Figure 21:
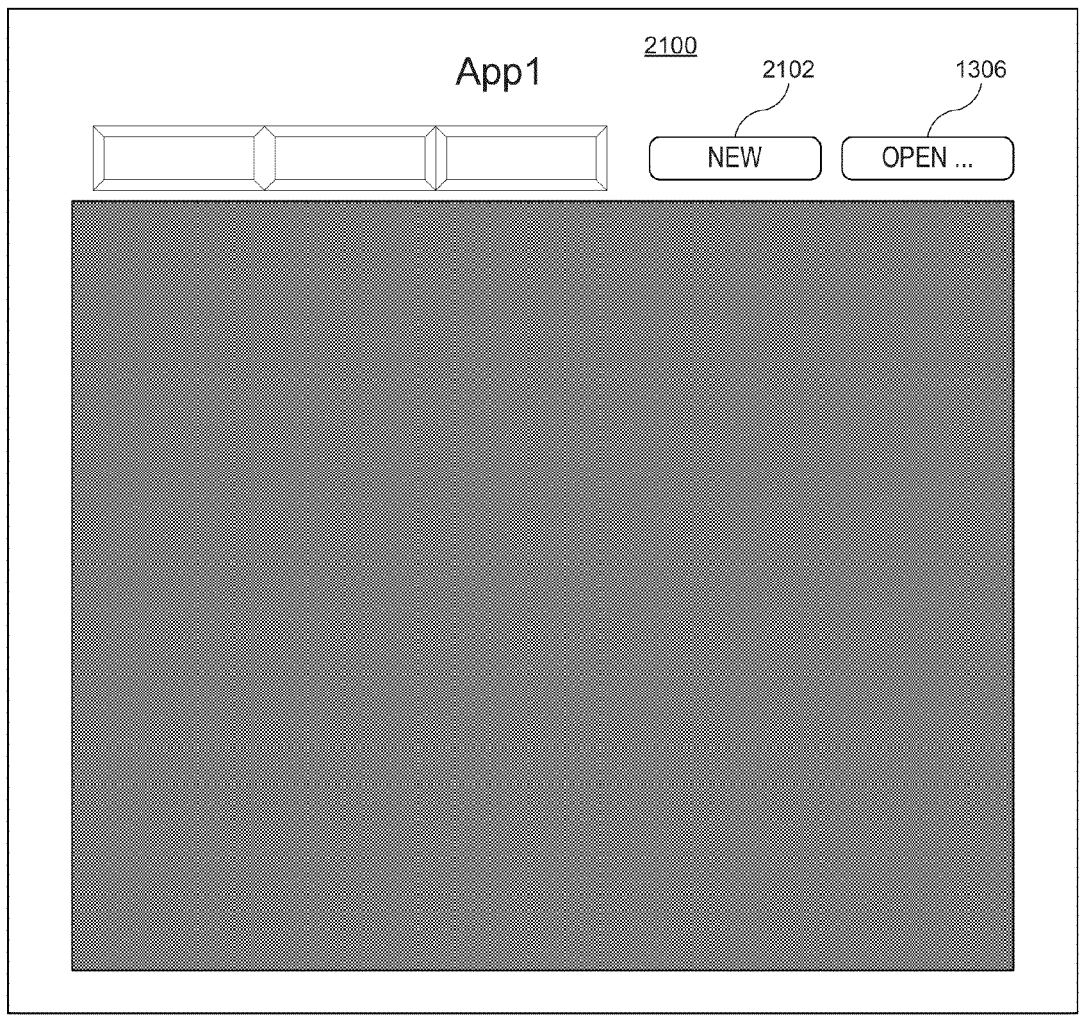
FIG. 21 shows a user interface for an editing app that supports file creation according to an embodiment of the present invention.

In some embodiments, new files to be stored on online content management service 100 can be created from within an editing app. FIG. 21 shows a user interface 2100 for an editing app that supports file creation according to an embodiment of the present invention. Interface 2100 can be generally similar to interface 1300 of FIG. 13.

Figure 22:
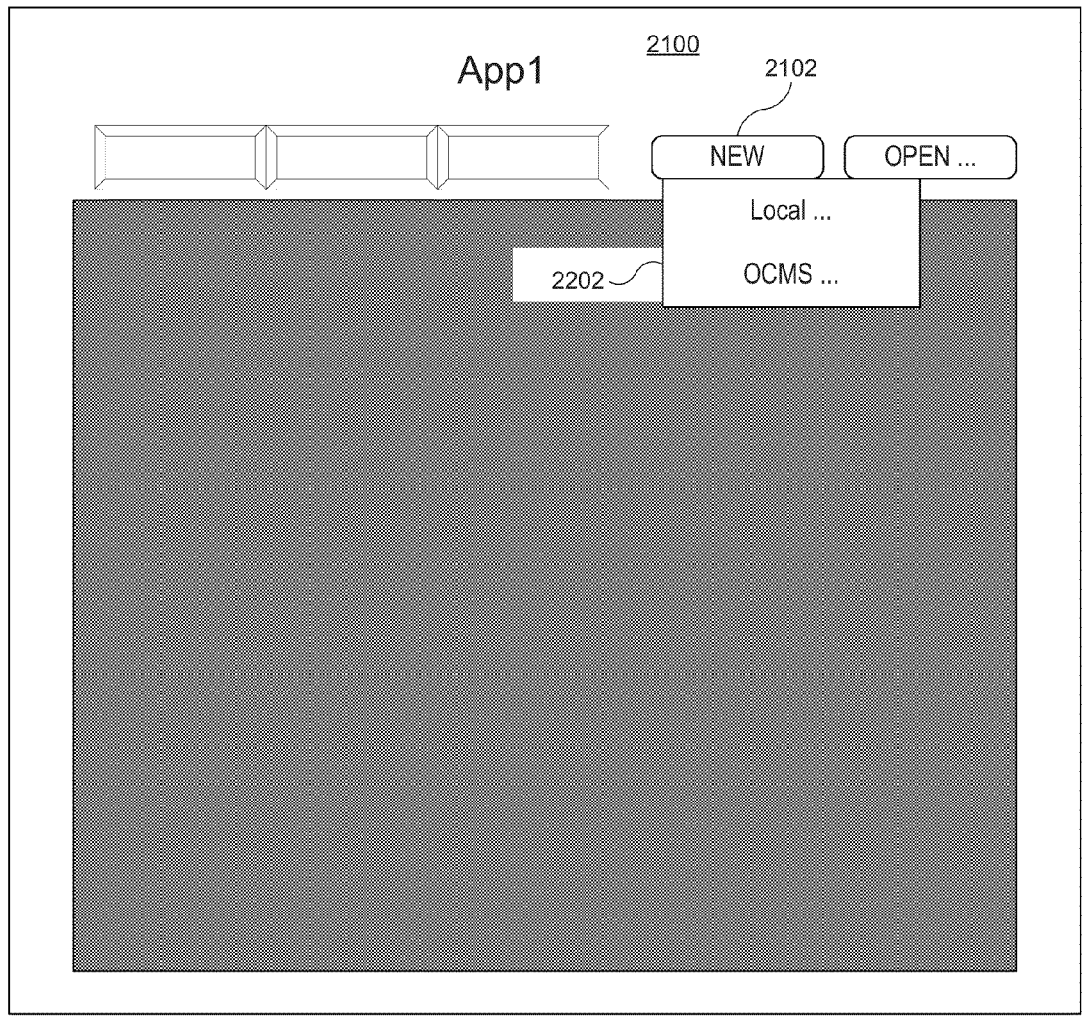
FIG. 22 shows a menu interface that can be invoked from the interface of FIG. 21 according to an embodiment of the present invention.

Interface 2100 can include a new button 2102 that is operable to create a new content item to be stored locally or on online content management service 100. For example, as shown in FIG. 22, in some embodiments, selecting new button 2102 can result in the editing app displaying a menu 2202 from which the user can indicate whether the new file should be opened locally or on online content management service 100. Selecting "local" can result in creation of a new local file; this process is not described further.

Figure 23:
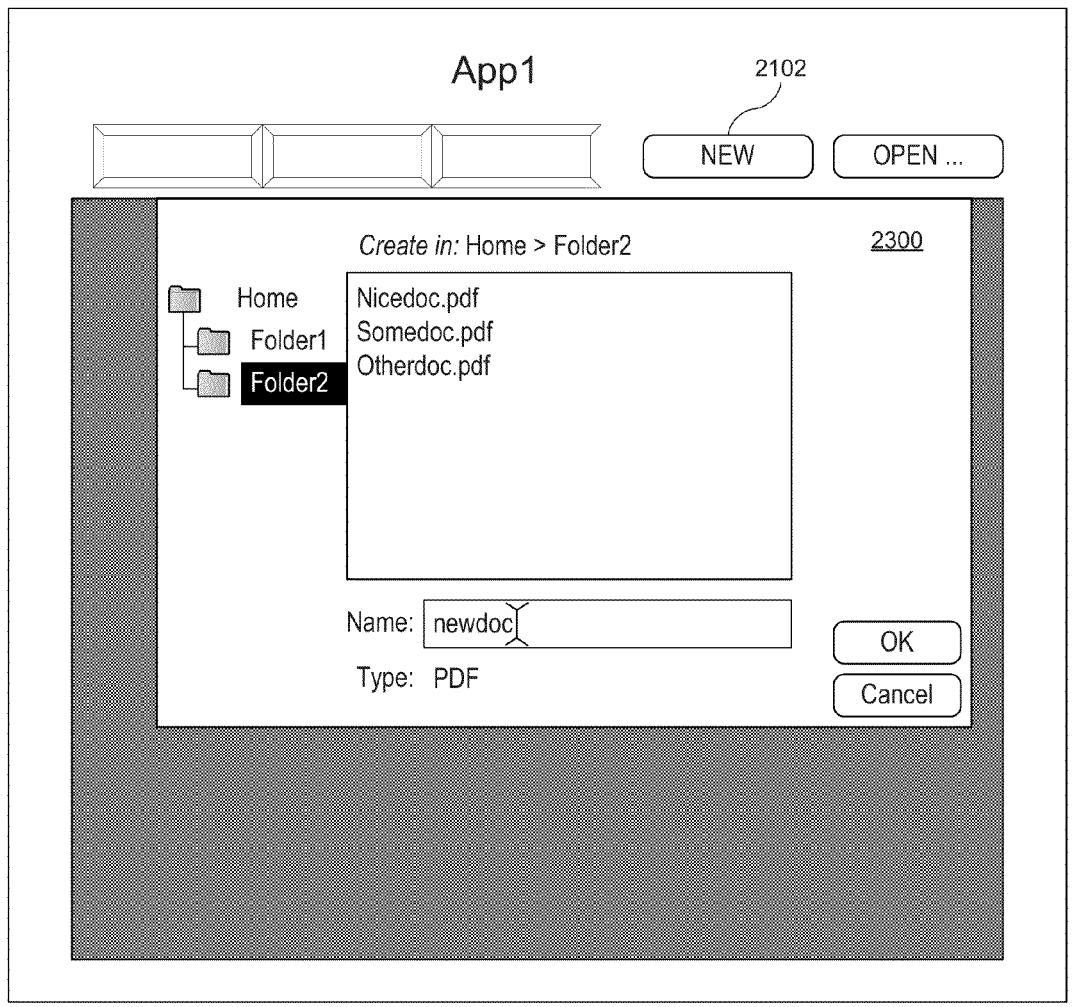
FIG. 23 shows a file namer interface according to an embodiment of the present invention.

Selecting "OCMS" can result in the editing app invoking a file namer interface 2300 as shown in FIG. 23. File namer interface 2300 can be similar or identical to file namer interface 1900 of FIG. 19. In some embodiments, file namer interface 2300 is implemented by the provider of online content management service 100, and the editing app can invoke a corresponding file namer API provided by the online content provider to generate and manage user interaction with file namer interface 2300. The file namer API can control the rendering of file namer interface 2300 of FIG. 23 and interpretation of user input. The file namer API can also manage communication with online content management service 100 to obtain item-identifying information for the new content item. When the new content item is defined, the file namer API can return item-identifying information to the editing app, which can then request the item from online content management service 100.

Figure 24:
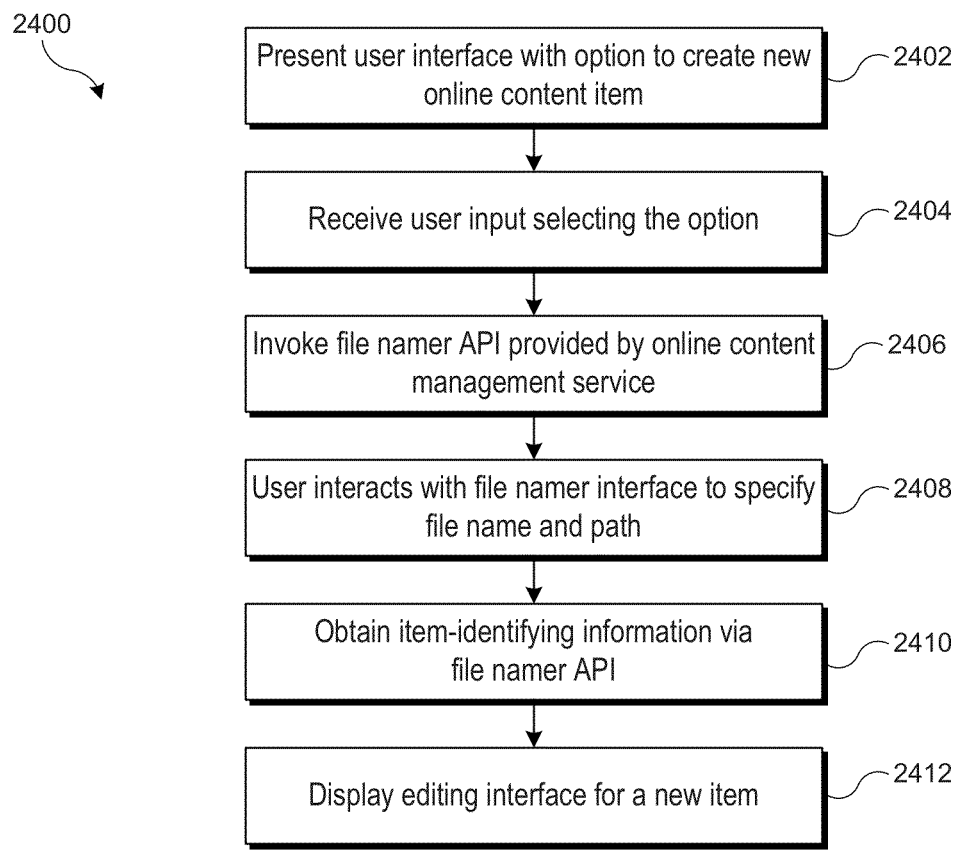
FIG. 24 is a flow diagram of a process for creating a content item within an editing app according to an embodiment of the present invention.

FIG. 24 is a flow diagram of a process 2400 for creating a content item within an editing app according to an embodiment of the present invention. Process 2400 can be implemented in any editing app (e.g., any of apps 124, 126, 128, 136, 138, 146 of FIG. 1).

At block 2402, the editing app can present a user interface that includes an option to create a document on online content management service 100 (e.g., menu 2202 of FIG. 22). At block 2404, the user can select this option. In response, at block 2406, the editing app can invoke a file namer API provided by the provider of online content management service 100. In some embodiments, the file namer API can include code that renders file namer interface 2300 and code that interprets user input data when the user interacts with file namer interface 2300. In some embodiments, the file namer API can return information to the editing app that the app can use to render file namer interface 2300 and interpret user input.

At block 2408, the user can define the new content item using file namer interface 2300. When the user has defined the new content item, the file namer API can communicate with online content management service 100 to receive item-identifying information and can provide that information to the editing app at block 2410.

At block 2412, the editing app can display an editing interface for a new content item. Thereafter, the user can edit the content using the editing app. Editing of the content item can proceed similarly to process 1000 of FIG. 10, with the content item being saved to online content management service 100 using the item-identifying information provided at block 2410.

Certain embodiments can leverage the file-creation functionality to allow an existing content item to be saved to the online content management service at a new location from within an editing app, thus providing a "save as" option. For example, a user can open a locally-stored content item in an editing app, then save the content item as a new item on online content management service 100. As another example, a user can open a content item from online content management service in an editing app (e.g., using processes described above), then save the content item to a different location on online content management service 100, also from within the editing app.

Figure 25:
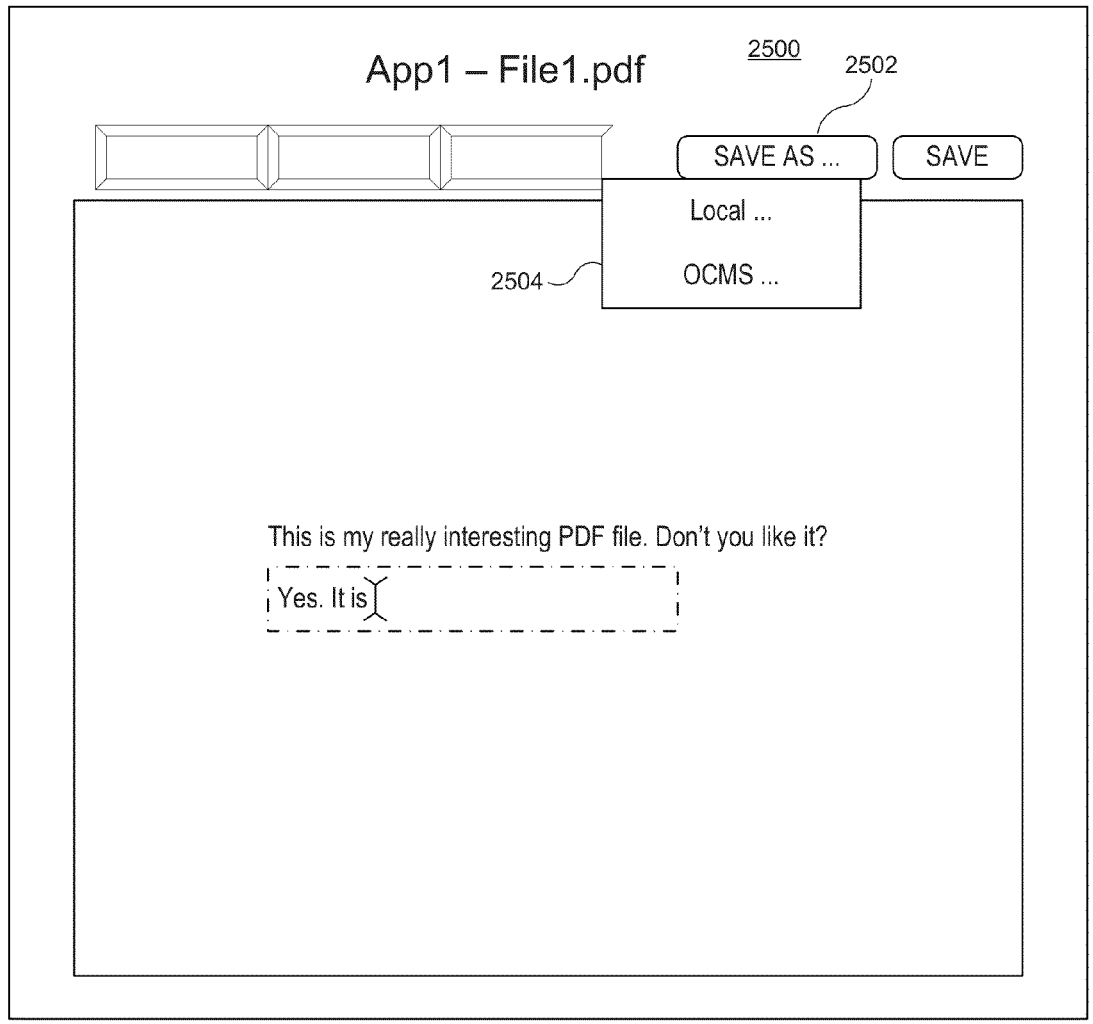
FIG. 25 shows an interface for an editing app with a "save as" option according to an embodiment of the present invention.

FIG. 25 shows an interface 2500 for an editing app with a "save as" option according to an embodiment of the present invention. Interface 2500 can be generally similar to other editing interfaces described above (e.g., interface 600 of FIG. 6). In this example, interface 2500 can include a "save as" button 2502 that the user has selected. Selecting save-as button 2502 can result in editing app displaying menu 2504, allowing the user to select whether to save locally or to online content management service 100. In some embodiments, both options can be made available regardless of the current storage location of the content item. Thus, a locally stored item can be saved as an online item, an online item can be saved as a local item, or an online item can be saved as a different online item.

If the user selects the option in menu 2504 to save to the online content management system, the editing app can invoke a file namer interface. This interface can be similar or identical to file namer interface 2300 of FIG. 23, allowing the user to designate a "target" name and path for saving the item. In some embodiments, if the content item is currently stored on online content management system 100, the path can default to the current location where the content item is stored. Further, the file name field in file namer interface 2300 can default to a name derived from the current name of the item, such as "Copy of currentname" or "currentname (2)," where "currentname" is the current name of the content item.

A "save as" operation can be performed without overwriting or deleting the source content item; in effect, a new item is saved to the target path and file name specified by the user, and the source and new items can co-exist as different items in the same system or on different systems. In some embodiments, if the user selects the folder path and item name of the source item (or the path and name of any existing content item) as the new path and name, a warning message can be generated and the user can be prompted to confirm that the existing item should be replaced.

Figure 26:
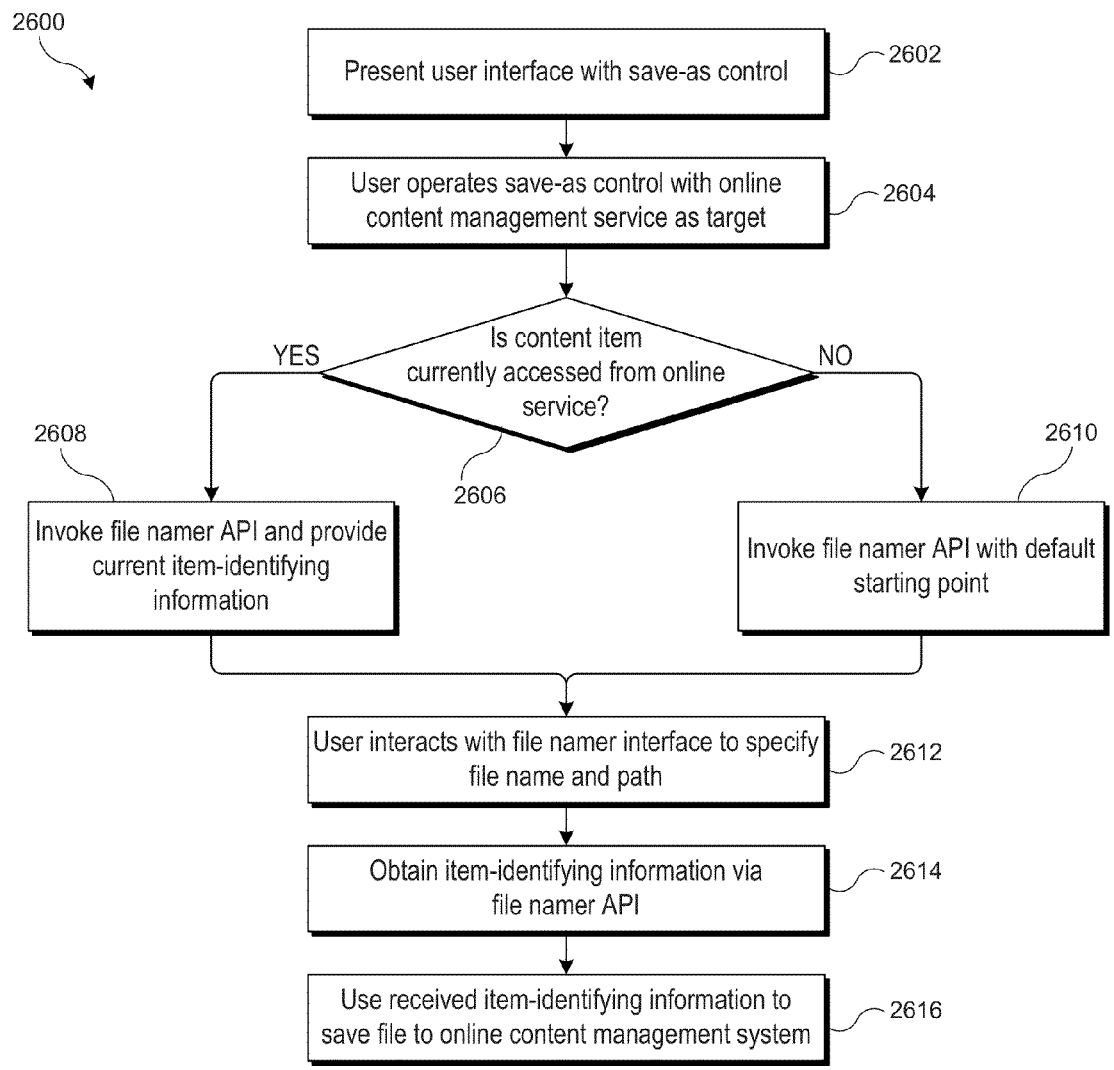
FIG. 26 shows a flow diagram of a process for a save-as operation according to an embodiment of the present invention.

FIG. 26 shows a flow diagram of a process 2600 for implementing a save-as operation according to an embodiment of the present invention. Process 2600 can be implemented, e.g., in any editing app.

At block 2602, the editing app can present an interface option allowing the user to perform a save-as operation to save the content item to online content management service 100, e.g., menu 2504 of FIG. 25. At block 2604, the user can select this option.

At block 2606, the editing app can determine whether the content item is currently stored on online content management service 100 or elsewhere. If the content item is currently stored on online content management service 100, the editing app can invoke the file namer API and provide the current item-identifying information at block 2608. The same file namer API can support both "new" and "save as" operations. The file namer API can use this information to initialize a file namer interface (e.g., interface 2300 of FIG. 23) based on the current file name and/or path. If, at block 2606, the content item is not currently stored on online content management service 100, the editing app can invoke the file namer API without providing current item-identifying information at block 2610. In some instances, the editing app can provide a current file name at block 2610.

At block 2612, the user can interact with file namer interface 2300 to define the target path and filename. In some embodiments, file namer interface 2300 can be initialized based on information provided by the editing app at block 2608 or 2610. For example, if current item-identifying information is provided at block 2608, file namer interface 2300 can be initialized based on the path and/or file name. If only a file name is provided at block 2610, file namer interface 2300 can be initialized with the user's home folder as the path and the file name populated by default.

Once the user has defined the target path and filename at block 2612, the editing app can receive new item-identifying information from the file namer API at block 2614. At block 2616, the editing app can use the new item-identifying information to save the content item to online content management service 100.

Figure 27:
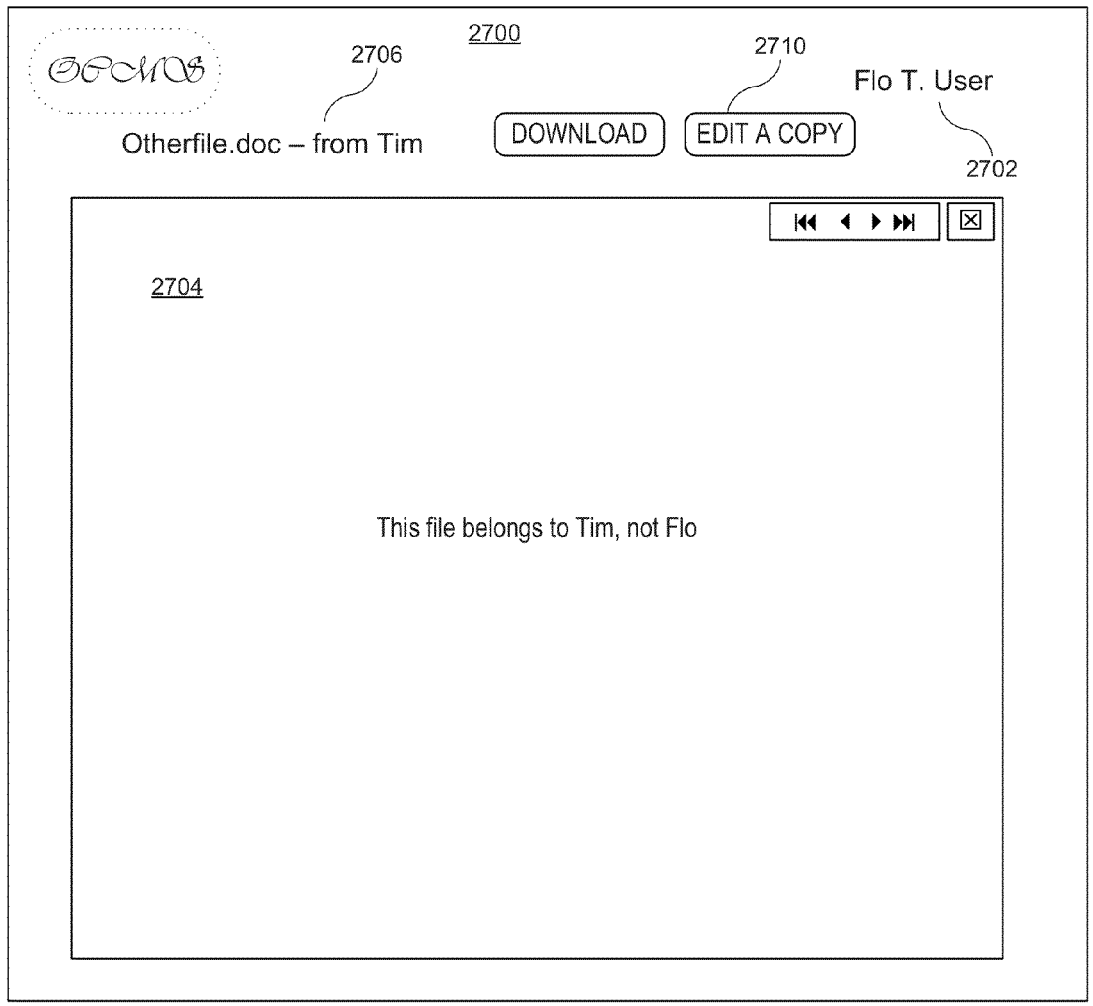
FIG. 27 shows a preview interface according to an embodiment of the present invention.

In some embodiments, a client app (e.g., client app 132, 136 or 144 of FIG. 1) can also implement a "save as" option, e.g., in connection with a content item previewer as shown in FIG. 4. FIG. 27 shows a preview interface 2700 according to an embodiment of the present invention. In this example, a user "Flo," whose identity is indicated at 2702, is viewing a content item 2704 that belongs to another user "Tim." That the item belongs to Tim can be indicated, e.g., in region 2706.

Since the item belongs to Tim. Flo might or might not have rights to edit it. For example, some embodiments of online content management service 100 can allow a user to send a "share link" (e.g., a URL) to an item to another user. The receiving user can use the share link to view the item but generally is not permitted to modify it. As another example, some embodiments of online content management service 100 can allow one user to grant limited rights (e.g., view but not modify) to other users. In such instances, a user such as Flo may wish to save a copy of the item to her own account and edit it.

To facilitate such operations, interface 2700 can include a "edit a copy" button 2710. If the user viewing interface 2700 selects button 2710, a file namer interface similar or identical to interface 2300 of FIG. 23 can be presented. The interface can be initialized using the current name of the item. If the item is located in a folder where the user has rights to modify or add items, that folder can be the default path; otherwise, the path can default to the user's home folder. In another embodiment, when a user selects button 2710, the content item can be opened in an editing app (e.g., with an interface similar to those of FIG. 6A, 6B, or 25), and the user can be prompted to provide a name and path for saving the item at a later point (e.g., when the user selects "save" or "save as" from within the editing app).

In some embodiments, edit-copy button 2710 can be presented every time the previewer is in use. In other embodiments, edit-copy button 2710 can be hidden or shown depending on assumptions about likely user behavior. For example, if a user is previewing a document in her own folder, it may be unlikely that she would want to start editing a copy (as opposed to editing the original), whereas if she is viewing a document using a share link, she may be more likely to want to save a copy to her own account. Accordingly, in some embodiments, interface 400 can be used for previewing content items to which the user has edit rights while interface 2700 can be used for previewing content items to which the user does not have edit rights.

Once the user has saved the content item to her own account, she can edit, modify, or otherwise operate on it, e.g., using any of the interfaces and workflows described above.

The various workflows and processes described herein can provide users with flexibility in interacting with content items stored on an online content management service. Users can create, edit, and/or save different versions of content items on a variety of platforms using workflows that have a similar feel to working with locally stored items. Further, workflows as described herein can be implemented on any or all of a user's devices (including devices that implement different operating platforms), allowing the user to seamlessly access and edit content items on different devices at different times. From the user's perspective, workflows like those described herein can help reduce extra effort associated with using an online content management service, allowing the user to more easily enjoy the benefits of such services (e.g., cross-platform access, reliable backup, etc.).

Any app that can read, create, modify, or otherwise make use of at least one type of content item can be used as an operating app. As described above, in some instances, the user can select an operating app from a client app using an app chooser interface that presents a list of apps from which the user selects. The app chooser in some embodiments can filter apps contextually, e.g., based on supported file type(s) and/or class(es) of operations. In some embodiments, operating app providers who want their apps included in the app chooser can register their apps with the online content service provider. At registration, the app provider can supply information about the app, such as name, icon, version information, supported file type(s), supported class(es) of operations, supported platform(s), and location(s) from which the user can obtain the app. The online content management service provider can store this app information in a data store that is accessible to the app chooser, and the app chooser can use the stored app information when selecting apps to include in the interface in a given context.

In some embodiments, online content management service 100 can implement security policies to limit access by operating apps. One example of a security policy includes requiring that operating apps be linked to the user's online account as a precondition for providing access. As described above, a linked app can be permitted to access the user's online content items; permitted access can include creating and/or deleting items as well as reading and/or modifying existing items. In some embodiments, the online content management service can restrict use of any or all of the workflows described herein to apps that have been linked to the user's account.

Linking of an unlinked operating app can be integrated into workflows, e.g., as described above with reference to FIG. 9. In some embodiments, an app can disable options such as creating new online items or saving an item as an online item unless it is linked. In other embodiments, if the user selects an operation that would create or modify an online content item when the app is not linked, the app can first prompt the user to establish the link, then execute the selected operation.

In some embodiments, online content management service 100 can allow unlinked apps to have limited access to a user's online content items. For example, online content management service can associate content into "collections" based on user activity. (The collections as such might or might not be visible to the user.) If a user selects an unlinked operating app to operate on a particular content item, it can be inferred that the user wants to allow that app to access that item. Accordingly, the content item can be added to a collection of items accessible by the unlinked app. At any given time, an unlinked app can be granted access to items in its collection but not to other items. In some embodiments, an unlinked app can be restricted from certain activities, such as creating new content items, while being allowed to access existing items for which the user has indicated a desire to allow access.

In some instances, an operating app may require the user to create an account with a third-party service provider. For example, in the case of ordering apps, the order fulfillment service may need user information in order to deliver the order and/or collect payment. In some embodiments, when an operating app that requires a user account is invoked from a client app, the client app can provide user data to the operating app based on the information associated with the user's online content account (e.g., the user's name, email address, etc.). This can speed up account creation on the other service by reducing the need for the user to re-enter data.

While the invention has been described with respect to specific embodiments, one skilled in the art will recognize that numerous modifications are possible and that features described in connection with different embodiments can be combined. For example, while the description above may make reference to specific operations such as editing, printing, or ordering products, the functionality of an operating app can include any of these and/or other operations that may be performed using a content item. Any type of content item can be accessible to an operating app using workflows, processes, and interfaces similar to those described above.

An app chooser interface can represent available apps in a variety of formats (e.g., names and/or icons), and apps can be but need not be grouped as described above. Groups other than those described above can be used, and different groups might or might not be mutually exclusive, depending on how the groups are defined. Any group of apps can be sorted into a desired order based on various sort criteria such as name, recency of use, frequency of use, popularity or rating, an editorially-determined order, and so on. In some embodiments, the user may be able to change the sorting and/or grouping criteria.

In some embodiments described above, an app chooser can present recommended apps. Recommendations can be based on various criteria or combinations of criteria including but not limited to the examples described above. While recommending apps can be helpful to the user, it is not required. For instance, in some embodiments, the app chooser may offer a selection based on apps that are already installed on the client device and/or linked to the user's account. In some embodiments, the app chooser may provide a referral to an online app source (or multiple such sources) without recommending specific apps.

Further, all of the interfaces described above and shown in the drawings are illustrative and can be modified as desired. The interfaces can be graphical user interfaces, with on-screen control elements that the user can operate, e.g., using a pointing device or touchscreen to select and activate the control elements. Other types of interfaces can also be used, including interfaces using soft keys, keystrokes, gestures, or the like. In addition, while visual interfaces are shown, it is to be understood that interfaces can also incorporate other sensory modalities, and an interface can have audio elements (e.g., voice command inputs and/or synthesized speech outputs), tactile and/or haptic elements, and so on, in addition to or instead of visual elements.

Embodiments described above may make reference to data structures and databases or data stores. It is to be understood that these terms can encompass any techniques and devices for organizing information into discrete records that can be stored, retrieved and interpreted by computer systems.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
    providing from a user device, by a client application configured to interface with an online content management service system and executing on the user device, authorization information to the online content management service system via a computer network to authorize the client application to access the online content management service system;
    displaying on the user device, by the client application, an identifier of a first content item stored in a cloud storage on the online content management service system;
    enabling, by the client application, a user to request edit control of the first content item;
    detecting, by the client application, that the user has requested edit control of the first content item;
    displaying on the user device, by the client application, in response to detecting that the user has requested edit control of the first content item, a selection interface operable to present a set of one or more selectable editing application identifiers to the user and to enable the user to select from the set a preferred editing application for editing locally the first content item, the set of one or more selectable editing application identifiers capable of including a particular editing application identifier to a particular editing application not installed on the user device;
    receiving, via the selection interface, a user selection of the preferred editing application, the preferred editing application being different than the client application;
    if the preferred editing application has not been installed on the user device:
        enabling the user device to download the preferred editing application, and
        enabling the user device to provide authorization information to the online content management service system;
    if the preferred editing application has been installed, regardless of whether the preferred editing application has provided authorization information to the online content management service system, providing to the preferred editing application, by the client application, item-identifying information of the first content item, the item-identifying information being usable by the preferred editing application to obtain the first content item stored on the online content management service system;
    if the preferred editing application has been installed, the authorization information has been provided to the online content management service system, and the authorization information has been verified by the online content management service system:
        enabling the preferred editing application to save the first content item, as edited, in the cloud storage, and
        upon user request, saving the first content item, as edited, by the preferred editing application in the cloud storage; and
    if the preferred editing application has been installed, and the authorization information has not been provided to the online content management service system:
        enabling the authorization information to be provided to the online content management service system for verification, and
        until the authorization information is provided to and verified by the online content management service system, not enabling the preferred editing application to save the first content item, as edited, in the cloud storage, and upon user request, saving the first content item, as edited, by the preferred editing application in a local storage.

2. The method of claim 1 wherein the first content item has a first content type and the method further comprises identifying the set of one or more selectable editing applications usable to edit content items having the first content type.

3. The method of claim 1 further comprising directing the user device to execute the preferred editing application by, at least in part, the client application supplying a uniform resource locator (URL) that references a location of the preferred editing application to a URL handler on the user device.

4. The method of claim 3 wherein providing the item-identifying information includes appending an item identifier in a reference handler portion of the URL.

5. The method of claim 1 wherein the selection interface includes a set of one or more selectable icons corresponding to the set of one or more selectable editing application identifiers, the set of one or more selectable icons arranged into a plurality of groups,
the plurality of groups including a first group of selectable icons corresponding to applications that are installed on the user device and linked to the online content management service system,
the plurality of groups further including at least one of:
a second group of selectable icons corresponding to applications that are installed on the user device but not linked to the online content management service system; or
a third group of selectable icons corresponding to applications that are not installed on the user device and are recommended for use with the first content item.

6. The method of claim 5 further comprising, in the event that the preferred editing application corresponds to one of the icons in the third group:
installing the preferred editing application on the user device.

7. The method of claim 6 wherein installing the preferred editing application includes acquiring the preferred editing application from an online application source.

8. An electronic device comprising:
a data communication interface operable to communicate with an online content management service system;
a user interface including a display and a user input device; and
a processing unit coupled to the data communication interface and the user interface, the processing unit configured to:
provide by a client application configured to interface with the online content management service system, authorization information to the online content management service system via the data communication interface over a computer network to authorize the client application to access the online content management service system;
obtain, from the online content management service system via the data communication interface, information about a first content item stored in a cloud storage on the online content management service system;
display a first interface image by the client application, the first interface image for presenting an identifier of the first content item;
enable, by the client application, a user to request edit control of the first content item;
detect, by the client application, that the user has requested edit control of the first content item;
display, in response to detecting that the user has requested edit control, a second interface image by the client application, the second interface image for presenting a set of one or more selectable editing application identifiers to the user and enabling the user to select from the set a preferred editing application for editing locally the first content item, the set of one or more selectable editing application identifiers capable of including a particular editing application identifier to a particular editing application not installed on the user device;
receive, via the second interface, a user selection of the preferred editing application, the preferred editing application being different than the client application;
if the preferred editing application has not been installed on the user device:
enable the user device to download the preferred editing application, and
enable the user device to provide authorization information to the online content management service system;
if the preferred application has been installed, regardless of whether the preferred editing application has provided authorization information to the online content management service system, provide to the preferred editing application item-identifying information of the first content item, the item-identifying information being usable by the preferred editing application to obtain the first content item stored on the online content management service system via the data communication interface;
if the preferred editing application has been installed, the authorization information has been provided to the online content management service system, and the authorization information has been verified by the online content management service system:
enable the preferred editing application to save the first content item, as edited, in the cloud storage, and
upon user request, save the first content item, as edited, by the preferred editing application in the cloud storage; and
if the preferred editing application has been installed, and the authorization information has not been provided to or verified by the online content management service system:
enable the authorization information to be provided to the online content management service system for verification, and
until the authorization information is provided to and verified by the online content management service system, not enable the preferred editing application to save the first content item, as edited, in the cloud storage, and upon user request, save the first content item, as edited, by the preferred editing application in a local storage.

9. The electronic device of claim 8 wherein the processing unit is further configured to present a control operable by the user to access an online application source from which the preferred editing application is obtainable.

10. The electronic device of claim 8 wherein the processing unit is further configured to launch the preferred editing application by, at least in part, the client application supplying to an operating system a uniform resource locator (URL) that references a location of the preferred editing application to a URL handler on the electronic device.

11. The electronic device of claim 10 wherein the processing unit is further configured to append, by the client application, an item identifier in a reference handler portion of the URL.

* * * * *